United States Patent
Ozaki et al.

(10) Patent No.: US 9,286,317 B2
(45) Date of Patent: Mar. 15, 2016

(54) INFORMATION PROCESSING EQUIPMENT

(71) Applicant: PANASONIC CORPORATION, Osaka (JP)

(72) Inventors: Minoru Ozaki, Fukuoka (JP); Kouji Mutou, Fukuoka (JP); Yutaka Iyoki, Fukuoka (JP); Atsurou Kitazawa, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 390 days.

(21) Appl. No.: 13/719,554

(22) Filed: Dec. 19, 2012

(65) Prior Publication Data
US 2013/0166613 A1    Jun. 27, 2013

(30) Foreign Application Priority Data
Dec. 21, 2011    (JP) .................................. 2011-280347

(51) Int. Cl.
G06F 17/30    (2006.01)
G06F 3/06    (2006.01)

(52) U.S. Cl.
CPC .......... *G06F 17/30194* (2013.01); *G06F 3/067* (2013.01); *G06F 3/0613* (2013.01)

(58) Field of Classification Search
CPC ...................................... G06F 3/067
USPC ......................................... 707/812
See application file for complete search history.

(56) References Cited

U.S. PATENT DOCUMENTS

| | | | | |
|---|---|---|---|---|
| 3,681,756 A * | 8/1972 | Burkhard et al. | ............. | 704/205 |
| 4,459,701 A * | 7/1984 | Lamiral et al. | ................ | 375/360 |
| 4,805,198 A * | 2/1989 | Stern et al. | .................... | 375/371 |
| 5,150,386 A * | 9/1992 | Stern et al. | .................... | 375/371 |
| 5,487,092 A * | 1/1996 | Finney et al. | ................. | 375/354 |
| 5,574,516 A * | 11/1996 | Kanai et al. | .................... | 348/742 |
| 8,171,241 B2 * | 5/2012 | Nagai et al. | ................... | 711/156 |
| 2010/0265761 A1* | 10/2010 | Shin | ............................. | 365/163 |
| 2013/0024641 A1* | 1/2013 | Talagala et al. | ............... | 711/170 |

FOREIGN PATENT DOCUMENTS

JP    2006-039794    2/2006

OTHER PUBLICATIONS

International Search Report dated Mar. 7, 2013.
Written Opinion of the International Searching Authority.

* cited by examiner

*Primary Examiner* — Baoquoc To
(74) *Attorney, Agent, or Firm* — Dickinson Wright PLLC

(57) ABSTRACT

It is an objective to diminish time required to read or write divided data. An information processing equipment that can be connected to a storage includes a division processing section for dividing original data into a plurality of sets of divided data and a storage location selection section that selects either the storage or a storage section of the information processing equipment as a divided data storage location and that stores the divided data into the selected storage location, wherein the division processing section determines a division ratio of divided data according to a data reading rate and/or a data writing rate of the storage location selected by the storage location selection section.

18 Claims, 14 Drawing Sheets

*FIG. 4*

MAP TABLE MT

| FOLDER/FILE NAME 101 | FIRST DIVIDED DATA FILE STORAGE LOCATION 102 | SECOND DIVIDED DATA FILE STORAGE LOCATION 103 | FIXED RATIO 104 |
|---|---|---|---|
| /aaa/bbb/ | D | M | --- |
| abc.c | D | $S_1$ | --- |
| xyz.txt | D | $S_2$ | 3:1 |

D: STORAGE SECTION 18
M: EXTERNAL STORAGE MEDIUM 40
$S_1$: ONLINE STORAGE 50-1
$S_2$: SERVER 30

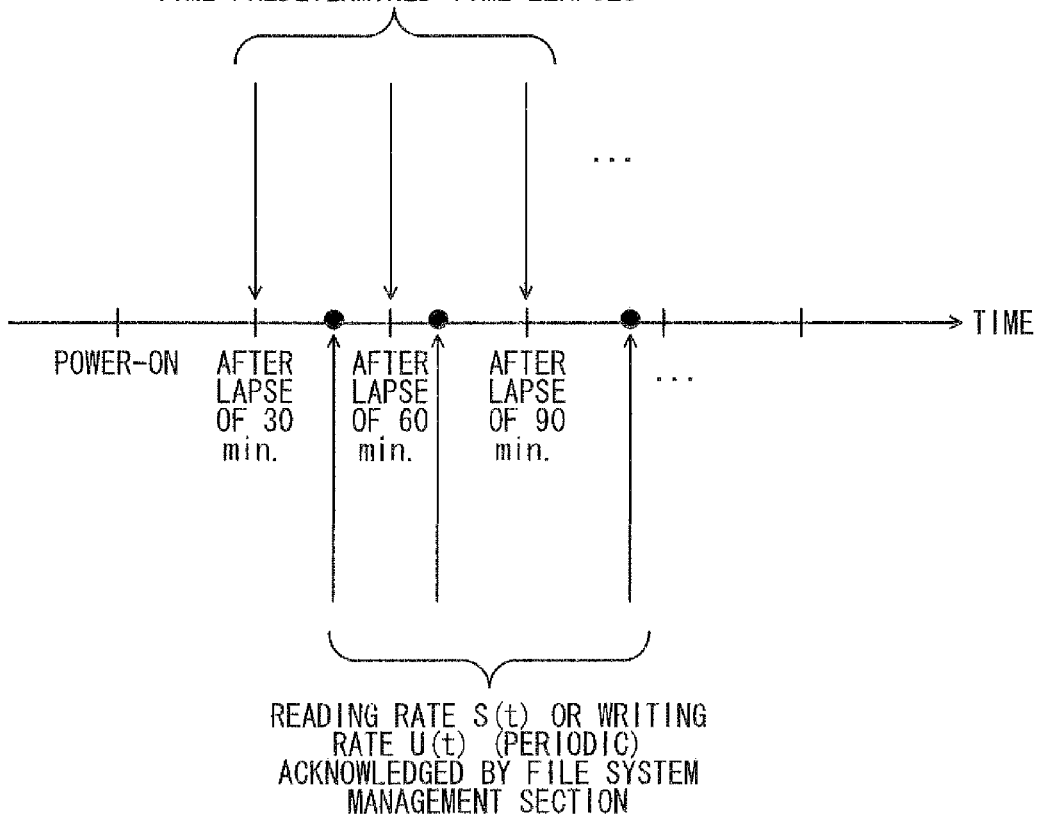

INFORMATION PROCESSING EQUIPMENT

BACKGROUND OF THE INVENTION

The invention relates to an information processing equipment that manages classified information, a method thereof, and a system using the information processing equipment.

From the viewpoint of information security, business corporations have recently performed as business practices dividing a classified information data file with high confidentiality into a plurality of different data files and storing the thus-divided respective data files into a plurality of different storage locations. Even if an employee of a corporation has lost, while he/she is on the road, a PC (Personal Computer) where one of the divided files is saved, leakage of the original data file can be prevented.

A storage location for these divided data files includes an online storage connected to a user device by way of a network as well as a local storage location like an external storage medium, such as a hard disk drive of a user device (e.g., a notebook PC), an SD card, and USB (Universal Serial Bus) memory. However, the user device consumes a much longer time to read the divided data files stored in the online storage than to read the divided data files stored in the local storage location. Likewise, the user device consumes a much longer time to write the divided data files into the online storage than to write the divided data files into the local storage location.

For these reasons, a technique described in connection with Patent Literature 1, for instance, has hitherto been known as a related art of dividing an original data file into a plurality of different divided data files and storing the divided data files into a plurality of different storage locations. According to Patent Literature 1, a remote site server divides an original file into different sizes of a plurality of files, to thus produce a larger-size first file and a smaller-size second file, and stores the first and second files in a correlated manner. In response to a first acquisition request from a client, the server transmits the first file to the client. Further, in answer to a second acquisition request that differs in time from the first acquisition request from the client, the sever transmits the second file to the client. The client consolidates the first and second files, to thus restore the original file.

CITATION LIST

Patent Literature

[PTL 1] JP-A-2006-039794

SUMMARY OF INVENTION

Technical Problem

According to Patent Literature 1, the time required to download files at the occasion of restoration of the file is shortened by means of storing the smaller-size files in the server. However, no consideration is given to a rate at which a file is read or a rate at which the file is written.

Accordingly, even when the smaller-size files are stored in the server; namely, the online storage, download involves consumption of much time according to a congestion rate of the network or the type of a communication fine (e.g., a wired or wireless communication line), which sometimes ends in failure to shorten a download time.

SUMMARY

The invention has been contrived in light of the circumstances and aims at shortening time required to read or write each of divided data files from or into a divided data file storage location.

According to one aspect of the present invention, there is provided an information processing equipment capable of being connected to a storage comprising: a division processing section configured to divide original data into a plurality of sets of divided data; a storage section configured to store the divided data; and a storage location selection section configured to select either the storage or any of the storage section as a storage location for the plurality of sets of divided data and to store the divided data into the selected storage location, wherein the division processing section is configured to determine a division ratio of divided data according to a data reading rate and/or a data writing rate of the storage location selected by the storage location selection section.

Advantageous Effects of Invention

The invention allows shortening of time required to read or write each of divided data files from or into a divided data file storage location.

BRIEF DESCRIPTION OF THE DRAWINGS

FIG. 4 is a configuration diagram of a map table stored in a storage section of the user device;

FIG. 6 is a descriptive view for providing time-series explanations about timing at which a rate measurement section measures a reading rate $S(t)$ or a writing rate $U(t)$;

DETAILED DESCRIPTION OF EMBODIMENTS

Embodiments of an information processing equipment of the invention are described by reference to the drawings. Explanations are provided by means of exemplifying a notebook PC as the information processing equipment of the invention. The information processing equipment of the invention is not limited to the notebook PC but may also be; for instance, a Smartphone, a PDA (Personal Digital Assistant), or an electronic book terminal.

In addition to being implemented as an information processing equipment, the invention can also be implemented as an information processing system (see descriptions provided below for more detailed information) including the information processing equipment and a program for activating the information processing equipment as a computer. Moreover, the invention can also be implemented as a method including processing (steps) to be executed by the information processing equipment.

Figure 1:
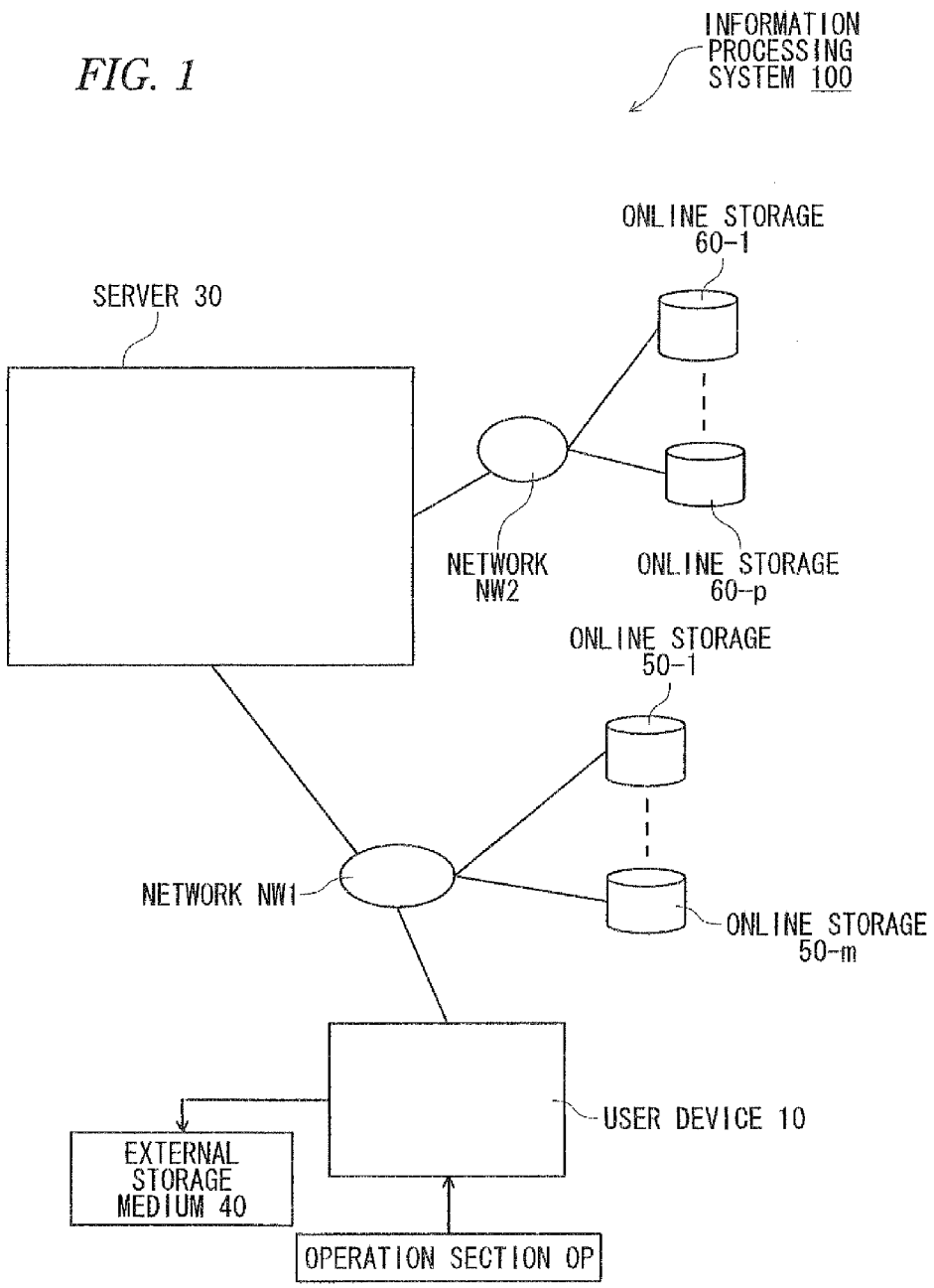
FIG. 1 is a system configuration diagram of an information processing system of an embodiment.

An information processing system 100 including the information processing equipment of the embodiment is now described by reference to FIG. 1. FIG. 1 is a block diagram of a system configuration of the information processing system 100 of the embodiment. The information processing system 100 shown in FIG. 1 includes a user device 10 serving as the information processing equipment; a server 30; an external storage medium 40; a plurality of online storages serving as storage devices 50-1, . . . , 50-*m*, 60-1, . . . , and 60-*p* ("m" and "p": natural numbers).

The user device 10, the server 30, and the online storages 50-1 to 50-*m* are connected to each other by way of a network NW1. The network NW1 corresponds to a wired network including an intranet, such as an interoffice portal site in an enterprise, and the Internet in the outside or a wireless network including a wireless LAN (local area network).

The server 30 and the online storages 60-1, . . . , 60-*p* are connected to each other by way of a network NW2. The network NW2 corresponds to a wired network including an intranet, such as an interoffice portal site in an enterprise, and the Internet in the outside or a wireless network including a wireless LAN (local area network).

The user device 10 performs various types of information processing in accordance with manipulation of an operation section OP performed by a client (hereinafter referred to as the "user"). The user device 10 can be connected to the external storage medium 40 and writes data into the external storage medium 40 or reads data from the same. Incidentally, the operation section OP is; for instance, a keyboard or a mouse connectable to the user device 10. When the operation section OP is made up of, such as a touch panel and a numeric keypad, the operation section OP can also be configured as being included in the user device 10. Moreover, the external storage medium 40 corresponds to; for instance, USB memory, an SD card, and an external HDD.

Figure 2:
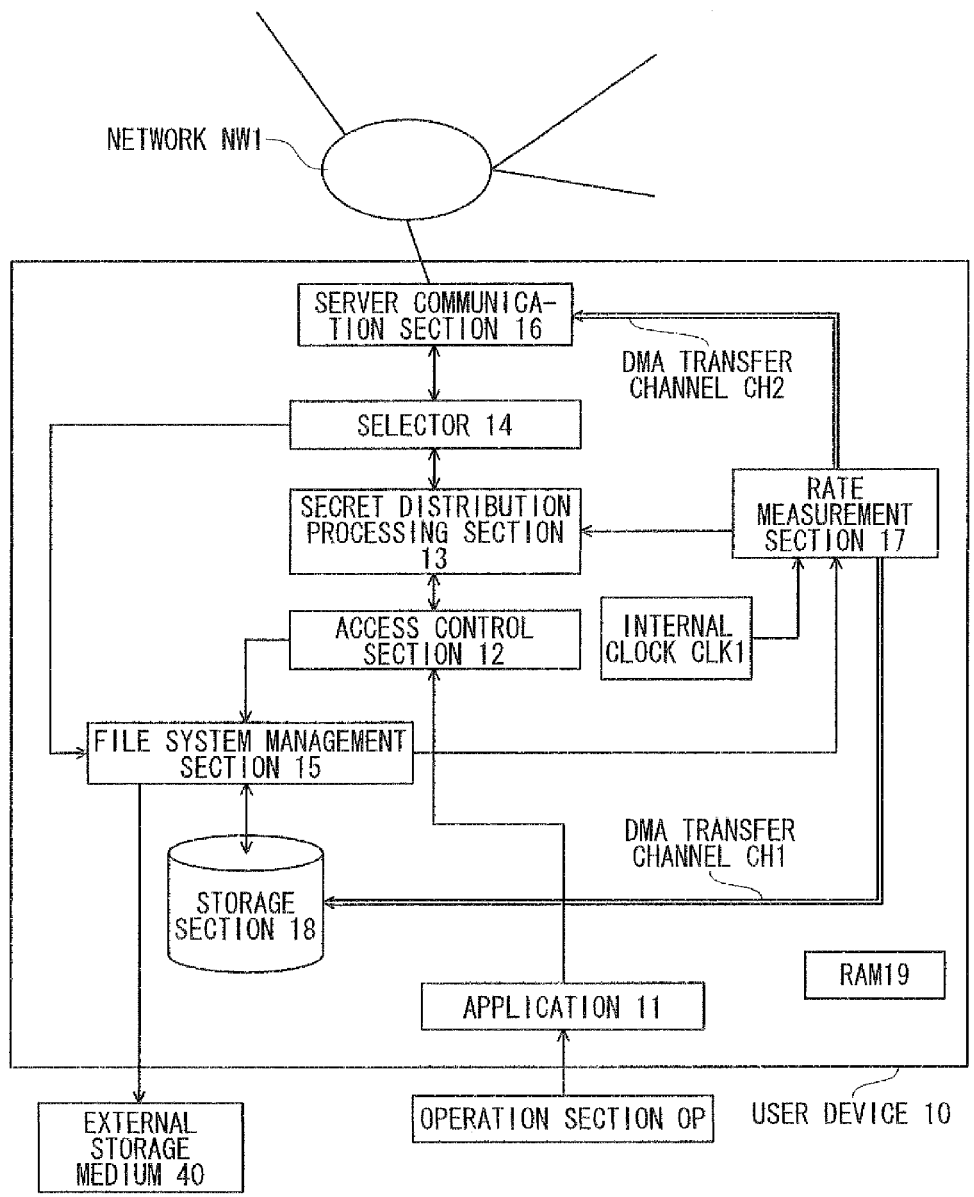
FIG. 2 is a block diagram showing an internal configuration of a user device.

(User Device: FIG. 2)

A configuration and operation of the user device 10 are now described in detail by reference to FIG. 2. FIG. 2 is a block diagram showing an internal configuration of the user device.

The user device 10 shown in FIG. 2 is configured so as to include an internal clock CLK 1, an application 11, an access control section 12, a secret distribution processing section 13 serving as a division processing section, a selector 14 serving as a storage location selection section, a file system management section 15, a server communication section 16, a rate measurement section 17, a storage section 18, and RAM 19.

The internal clock CLK1 is; for instance, one of functions of an OS (operating system) that cause the user device 10 to run as a computer and corresponds to a system clock (a clock) of the user device 10. A signal output from the internal clock CLK1, or clock information about the user device 10, is illustrated in FIG. 2 as being input to the rate measurement section 17. However, in reality, the clock information is input to individual sections of the user device 10.

The application 11 is made available as a result of being installed in advance in the user device 10 and gives the access control section 12 a command about operation specifics conforming to user's manipulation of the operation section OP. The operation specifics conforming to user's manipulation of the operation section OP includes; for instance, a division command for dividing one original data file into a plurality of divided data files or a restoration command for restoring one original data file from a plurality of divided data files.

Furthermore, unless otherwise explanations about a special exemplification are provided, explanations are given in the following descriptions by reference to a case where data of one original data file are divided into sets of data of a plurality of (e.g., two) divided data files and where data of one original data file are restored from the data of the plurality of (e.g., two in the same way) divided data files. Likewise, the same can also apply to a folder where a plurality of data files are stored in addition to the simple data file, such as that mentioned above.

In response to user's manipulation of the operation section OP, the application 11 sends to the access control section 12 an acknowledgment of identification information [e.g., a name of an original data file, an ID (identification), and others] about an original data file that is to be a target of the division command or the restoration command.

The access control section 12 inputs the acknowledgment information from the application 11. In accordance with the acknowledgment information from the application 11, the access control section 12 commands the file system management section 15 to extract a map table MT (see FIG. 4), which is stored in the storage section 18, into the RAM 19. In accordance with the command from the access control section 12, the file system management section 15 reads a map table MT from the storage section 18 and temporarily extracts the map table MT in the RAM 19. Incidentally, the map table MT will be described later by reference to FIG. 4. In the embodiment, although the file system management section 15 extracts all of the specifics of the map table MT into the RAM 19, only specifics of the map table MT for which the access control section 12 has issued the command and which correspond to the original data file identification information can also be temporarily extracted.

In accordance with the acknowledgment information from the application 11, the access control section 12 specifies a record of the map table MT corresponding to the original data file identification information that is to be a target of the division command or the restoration command and sends an acknowledgement of information about the thus-specified record to the secret distribution processing section 13.

When a record of the original data file that is to serve as the target of the division command or the restoration command is not in the map table MT, the access control section 12 sends an acknowledgment to this effect to the application 11. The application 11 displays on an unillustrated display device the acknowledgment information received from the access control section 12 and, for instance, sends an acknowledgment to the user such that the user is prompted to create a record of the original data file to be a target of the division command or the restoration command.

When prompting the user to create a record, the application 11 can also let the user enter all of items required for the map table MT or let the user enter some of the items and cause the access control section 12 to automatically determine and input the remaining items.

A manipulation signal aimed at adding the record of the original data file that is to be a target of the division command or the restoration command is presumed to be input to the application 11 by means of user's manipulation of the operation section OP that conforms to the acknowledgement aimed at prompting the user to create a record. The manipulation signal includes a variety of pieces of information required for the record that is to be a target of addition. In accordance with user's manipulation of the operation section OP, the application 11 outputs to the access control section 12 a signal aimed at adding to the map table MT the record of the original data file that is to be a target of the division command or the restoration command.

The access control section 12 adds to the map table MT extracted in the RAM 19 a record of the original data file that is to be a target of the division command or the restoration command. The map table MT is thereby updated.

The secret distribution processing section 13 serving as a division processing section divides data of the original data file into sets of data of two or more divided data files and also divides data of one original data file that is to be a target of the division command into sets of data of two divided data files. In this case, the division ratio comes to 1:1, and the number of division comes to two.

In the embodiment, secret distribution processing is mentioned by way of example division processing. However, the division processing is not limited to secret distribution processing. Incidentally, no specific limitation is imposed on an algorism of secret distribution processing performed by the secret distribution processing section 13. For instance, a known (k, n) threshold value secret distribution method described in connection with Non-Patent Document 1 is presumed to be used in the following explanations. The parameter "n" is the number of division.

(Non-Patent Document 1 for reference) A. Shamir: "How to share a secret," Communications of the ACM, 22, 11, pp. 612 to 613 (1979)

According to a divided data file storage location, the secret distribution processing section 13 determines a division ratio $(D_A:D_B)$ and the number of division $(D_A+D_B)$ for the original data file not in excess of the maximum number of division $D_{MAX}$ (e.g., $D_{MAX}$=10) previously specified by means of operation of the secret distribution processing section 13. The parameters $D_A$, $D_B$ are natural numbers. On the basis of the thus-determined division ratio $(D_A:D_B)$ and the number of division $(D_A+D_B)$, the secret distribution processing section 13 divides data of one original data file into division number of divided data files.

When the determined division ratio $(D_A:D_B)$ is reducible, the secret distribution processing section 13 divides data of one original data file by use of a division ratio $(D_{A'}:D_{B'})$, which is determined through reduction processing. In this case, the number of division $(D_{A'}+D_{B'})$ acquired after reduction processing rather than the number of division $(D_A+D_B)$ acquired before reduction processing is employed as the number of division. For instance, when a determined division ratio is "2:4," the secret distribution processing section 13 determines a division ratio as "1:2" and divides data of one original data file into data of three divided data files rather than data of six divided data files.

The secret distribution processing section 13 determines a division ratio and the number of division for data of the original data file on the basis of the reading rate S(t) or the writing rate U(t) (see descriptions provided later) of each storage location measured by the rate measurement section 17. For instance, when the number of storage locations is two (a storage location A and a storage location B), the secret distribution processing section 13 inputs a reading rate $S_A(t)$ or a writing rate $U_A(t)$ for the storage location A and a reading rate $S_B(t)$ or a write $U_B(t)$ for the storage location B from the rate measurement section 17.

It is preferable that the secret distribution processing section 13 utilize the reading rate $S_A(t)$ for the storage location A and the reading rate $S_B(t)$ for the storage location B at the time of determination of a division ratio and the number of division. However, it is also possible to utilize either the reading rate or the writing rate or both for each of the storage locations.

In general, the written data file are first stored in a buffer (like the RAM 19) in the user device 10 that is faster than the storage locations A and B in terms of a writing rate and subsequently stored in the storage locations A and B. For these reasons, latency time perceived by the user corresponds to a time during which the data file is written (stored) into the buffer. In short, the latency time perceived by the user becomes shorter than a time during which data are written into or read from the storage location without being affected by the writing rate of each storage location. However, the user cannot perform the next manipulation until reading of the data file is completed, so that the reading rate itself of each storage location leads directly to the user's latency time. Therefore, the secret distribution processing section 13 uses the reading rate of the storage location in preference to its writing rate.

On the basis of the reading rate $S_A(t)$ or the writing rate $U_A(t)$ for the storage location A and the reading rate $S_B(t)$ or the writing rate $U_B(t)$ for the storage location B, the secret distribution processing section 13 calculates a storage ratio $H_A:H_B$ that represents a ratio of the number of divided data files to be stored in the storage location A to the number of divided data files to be stored in the storage location B. On the basis of the thus-calculated storage ratio $H_A:H_B$, the secret distribution processing section 13 determines the division ratio $(D_A:D_B)$ and the number of division $(D_A+D_B)$ for the data of the original data file. In the embodiment, $D_A$ number of divided data files corresponding to the parameter $D_A$ are stored in the storage location A, and $D_B$ number of divided data files corresponding to the parameter $D_B$ are stored in the storage location B. Moreover, a relationship $D_A+D_B \leq D_{MAX}$ exists among the parameter $D_A$, the parameter $D_B$, and the parameter $D_{MAX}$.

When a division ratio which is appropriate for a divided data file storage location is previously determined as a fixed value (a fixed ratio) in the map table MT, the secret distribution processing section 13 performs division by preferentially using the fixed ratio as a division ratio. The fixed ratio is specified in the map table MT (see FIG. 4) to be described later by means of; for instance, user's desired manipulation (predetermined setting) of the operation section OP. Incidentally, the fixed ratio is not specified limitedly in the map table MT but can also be specified in; for example, another table (not shown) that stipulates identification information about a divided data file storage location and a fixed ratio.

For instance, when two storage locations (the user device 10 and the online storage 50-1) are available, the storage location A is presumed to be the user device 10, and the storage location B is presumed to be the online storage 50-1. The division ratio $D_A:D_B$ for a specific original data file previously determined for each of storage locations in the record of the map table MT is presumed to be 3:1. The secret distribution processing section 13 divides data of one original data file into data of four divided data files. Among the four divided data files, three divided data files are stored in the user device 10, and the remaining one divided data file is stored in the online storage 50-1.

After dividing the data of the original data file, the secret distribution processing section 13 creates divided data files by use of a data region of each of the divided data files and a header region of header information that is predetermined information written into the data of the divided data files. As will be described in detail later, the predetermined information corresponds to original data file identification information 206, divided data file number information 204, and storage location information 205 (see FIG. 5A). The secret distribution processing section 13 outputs each of the divided data files that include the header region and the data region to the selector 14.

The map table MT stored in the storage section 18 of the user device 10 is now described by reference to FIG. 4. FIG. 4 is a configuration diagram of the map table MT stored in the storage section 18 of the user device 10.

The map table MT shown in FIG. 4 is configured from items including a folder/file name 101, a first divided data file storage location 102, a second divided data file storage location 103, and a fixed ratio 104. For simplicity of explanation, FIG. 4 shows exemplification of the map table MT that has two storage locations for storing divided data files generated by the secret distribution processing section 13. In this regard, the number of divided data file storage locations is not limited to two in the embodiment. For instance, the number of storage locations may also be further added or deleted by means of user's manipulation performed by use of the operation section OP.

The first divided data file storage location 102 is identification information showing that the first storage location of the two storage locations is any one of the storage section 18, the external storage medium 40, the plurality of online storages 50-1, ..., 50-m, and the server 30. Likewise, the second divided data file storage location 103 is identification information showing that the second storage location of the two storage locations is any one of the storage section 18, the external storage medium 40, the plurality of online storages 50-1, ..., 50-m, and the plurality of online storages 60-1, ..., 60-p.

In the information processing system 100, the user device 10 cannot recognize presence of the plurality of online storages 60-1, ..., 60-p. For this reason, even when data are stored in the server 30 itself or any of the online storages 60-1, ..., 60-p, the user device 10 determines that the data are stored in the server 30, and hence the server 30 is indicated as a storage location in the map table. Which one of the server 30 and the online storages 60-1, ..., 60-p stores the data is preserved in the map table of the server 30.

In the map table MT shown in FIG. 4, for instance, the first divided data file storage location 102 and the second divided data file storage location 103 are represented by use of a plurality of parameters (D, M, $S_1$, $S_2$). The parameter D designates the storage section 18. The parameter M designates the external storage medium 40. The parameter $S_1$ designates the online storage 50-1. The parameter $S_2$ designates the online storage 60-1. The parameters designating storage locations are not limited to those mentioned above.

For instance, in relation to an original data file named "abc.c," some of all divided data files are stored in the storage section 18, and the other divided data files are stored in the online storage 50-1. The parameters of the first divided data file storage location 102 or the parameters of the second divided data file storage location 103 in the map table MT may also be changed by means of user's manipulation performed by use of the operation section OP.

The fixed ratio 104 is a division ratio of the original data file that was previously determined as a fixed value. When the fixed ratio 104 of the map table MT has previously been input by means of user's manipulation performed by use of the operation section OP, the secret distribution processing section 13 preferentially subjects the original data file, which is to be a target of secret distribution processing, to secret distribution by reference to records of the map table MT while taking the fixed ratio specified by the fixed ratio 104 as a division ratio. For instance, the secret distribution processing section 13 subjects data of the original data file named "xyz.txt" to secret distribution at a division ratio, or the fixed ratio "3:1," thereby creating four divided data files. Three of the four divided data files are stored in the storage section 18, and the remaining one divided data file is stored in the online storage 60-1.

Although not included in the map table MT shown in FIG. 4, items, such as the number of divided data files and the division ratio that are determined by the secret distribution processing section 13, can also be included in the map table MT.

Figure 5A:
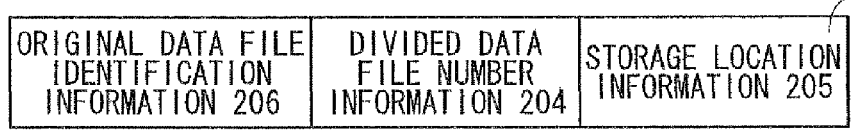
FIG. 5A is a descriptive view of a header structure of a divided data file.
Figure 5B:
FIG. 5B is a descriptive view of a structure of an original data file.
Figure 5C:
FIG. 5C is a descriptive view of a structure of a divided data file 1.
Figure 5D:
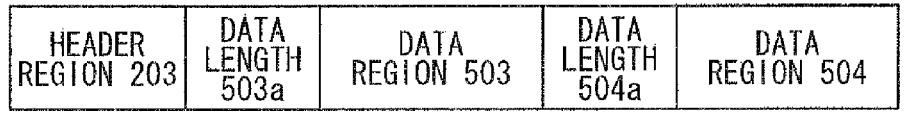
FIG. 5D is a descriptive view of a structure of a divided data file 2.

Header information of the divided data file, a data structure of the original data file, and a data structure of the divided data file are now described by reference to FIGS. 5A to 5D. FIG. 5A is a descriptive view of the header structure of the divided data file. FIG. 5B is a descriptive view of a structure of the original data file. FIG. 5C is a descriptive view of a structure of a divided data file 1. FIG. 5D is a descriptive view of a structure of a divided data file 2.

The header of the divided data file shown in FIG. 5A includes original data file identification information 206, divided data file number information 204, and storage location information 205. The original data file identification information 206 represents identification information about the original data file. The divided data file number information 204 is information representing the number of division determined by the secret distribution processing section 13 and what number of a divided data file of interest in the number of division. The storage location information 205 is storage location information about each of divided data files written by the secret distribution processing section 13 on the basis of the map table MT.

A structure of the divided data file 1 shown in FIG. 5B includes a header region 201 and a data region 501. The data region 501 is a data region generated as a result of a data region 500 of the original data file being subjected to secret distribution by the secret distribution processing section 13. The header region 201 is a header region shown in FIG. 5A.

Likewise, a structure of the divided data file 2 shown in FIG. 5C includes a header region 202 and a data region 502. The data region 502 is a data region generated as a result of the data region 500 of the original data file being subjected to secret distribution by the secret distribution processing section 13. The header region 202 is a header region shown in FIG. 5A.

Moreover, contents of respective sets of divided data in a plurality of divided data files can also be stored in one divided data file after being integrated into the divided data file as a divided data file storage method. As shown in FIG. 5D, a structure of such a divided data file includes a header region 203, data length information 503a and a data region 503, and data length information 504a and a data region 504. The data length information 503a represents a data length of the data region 503 of divided data generated by the secret distribution processing section 13. Likewise, the data length information 504a represents a data length of the data region 504 of divided data generated by the secret distribution processing section 13.

The selector 14 serving as the storage location selection section inputs each of divided data files output from the secret distribution processing section 13. The selector 14 selects a storage location for each of the divided data files according to the storage location information 205 in the header region of each of the data files divided by the secret distribution processing section 13 on the basis of the number of division and the division ratio. For example, when identification information showing "storage section 18" is written in the storage location information 205 in the header region of a divided data file Z, the selector 14 selects the "storage section 18" as a storage location for the divided data file Z.

In accordance with the selected storage location for each of the divided data files, the selector 14 outputs a divided data file write command to the file system management section 15 or the server communication section 16 for writing each of the divided data files.

Upon receipt of a command for reading the map table MT from the access control section 12, the file system management section 15 reads the map table MT from the storage section 18 and extracts the thus-read table into the RAM 19. In this regard, an arrow pertaining to control of extracting the map table MT from the file system management section 15 to the RAM 19 is omitted from FIG. 2.

In response to a command for reading or writing a divided data file output from the selector 14, the file system management section 15 reads a divided data file from a predetermined folder of the storage section 18 or writes the divided data file into the predetermined folder. The predetermined folder can be appropriately changed in response to user's manipulation of the operation section OP.

When the server communication section 16 writes or reads a divided data file or an ordinary data file that is not a divided data file into or from the storage location by way of the network, the file system management section 15 receives in each case an acknowledgement of a writing rate or a reading rate from the server communication section 16. In the embodiment, the storage location connected by way of the network includes the online storages 50-1, ..., 50-m, the server 30, and the online storages 60-1, ..., 60-p. The file system management section 15 sends an acknowledgment of the thus-input writing rate or reading rate to the rate measurement section 17. The writing rate or the reading rate can be calculated by dividing a volume (size) of target written data or target read data by a time required to write or read them.

The server communication section 16 acts as an interface for establishing a communication with the server 30 or any one of the online storages 50-1, ..., 50-m. On the basis of the command for writing a divided data file output from the selector 14, the server communication section 16 transmits a divided data file to the server 30 or any one of the online storages 50-1, ..., 50-m.

Having written or read a divided data file or an ordinary data file that is not a divided data file into storage locations; namely, any one of the online storages 50-1, ..., 50-m, the server 30, and the online storages 60-1, ..., 60-p, the server communication section 16 sends an acknowledgment of the writing rate or reading rate to the file system management section 15.

The rate measurement section 17 measures a rate at which data are read or written from or into a divided data file storage location and stores the thus-measured reading rate or writing rate into the RAM 19 or internal memory of the rate measurement section 17.

By means of training processing using a predetermined volume (size) of data, the rate measurement section 17 measures a rate at which data are read from or written into a divided data file storage location. Training processing is processing for measuring a rate at which data are read from or written into each of storage locations on the basis of time required to write or read the data into or from each of the storage locations (i.e., a writing time or a reading time) by writing or reading a predetermined volume of data from or into each of the storage locations.

In the embodiment, the rate measurement section 17 subjects the storage section 18 that serves as; for instance, a storage location A, to training processing by means of DMA transfer using a DMA transfer channel CH1, independently of operation of the secret distribution processing section 13, the selector 14, and the file system management section 15. Likewise, the rate measurement section 17 subjects the online storage 50-1 that serves as; for instance, a storage location B, to training processing by means of DMA transfer using a DMA transfer channel CH2, independently of operation of the secret distribution processing section 13, the selector 14, and the file system management section 15.

In relation to the reading rate or the writing rate of the storage section 18 serving as the storage location A which is not a connection target by way of the network, the rate measurement section 17 sends to the secret distribution processing section 13 an acknowledgement of the reading rate or writing rate measured by training processing.

In relation to the reading rate or the writing rate of the online storage 50-1 serving as the storage location B connected by way of the network, the rate measurement section 17 sends to the secret distribution processing section 13 an acknowledgement of either the reading/writing rate measured by means of training processing or the reading/writing rate acknowledged by the file system management section 15, whichever corresponds to any one of the maximum value, the minimum value, an average value, or the latest value.

The maximum value is the maximum reading rate or the maximum writing rate among reading rates or writing rates achieved since the user device 10 was activated after powered and represents the maximum rate achieved when a congestion rate of the network is minimum. The minimum value is the minimum reading rate or the minimum writing rate among reading rates or writing rates achieved since the user device 10 was activated after powered and corresponds to; for instance, a lowest reading rate or writing rate of the online storage 50-1 that can be guaranteed. The average value is; for instance, an hourly average reading rate of reading rates or an hourly average writing rate of writing rates achieved in one hour. The latest value represents a reading rate or a writing rate acquired most recently within 10 minutes. When there are a plurality of measured reading rates or a plurality of measured writing rates, an average of the plurality of reading rates or an average of the plurality of writing rates can be the latest value.

An acknowledgment of either the reading rate or the writing rate, whichever corresponds to any of the maximum value, the minimum value, the average value, and the latest value, that is sent from the rate measurement section 17 to the secret distribution processing section 13 can also be changed according to user's desired manipulation (desired settings) made by use of the operation section OP.

When the rate measurement section 17 uses the maximum value, reading or writing operation can be efficiently performed at a low level of network congestion. When the minimum value is used, reading or writing operation can be efficiently performed at a high level of network congestion.

When the average value is employed, reading or writing operation can be efficiently performed over a network that attains a stable communication rate.

By reference to FIG. 6, explanations are now given to timing when the rate measurement section 17 performs training processing. FIG. 6 is a descriptive view for providing time-series explanations about timing at which the rate measurement section measures the reading rate S(t) or the writing rate U(t).

In the embodiment, the rate measurement section 17 performs training processing and measures the reading rate S(t) or the writing rate U(t) every time 30 minutes elapse; that is, after a lapse of 30 minutes, 60 minutes, 90 minutes, . . . , since power-on (activation) of the user device 10. Although training processing periodically performed by the rate measurement section 17 after a lapse of 30 minutes since power-on is not indispensable, it is preferable to perform training processing at power-on (namely, at start-up). Moreover, settings pertaining to a time cycle of performance of training processing can also be changed by user's manipulation performed by use of the operation section OP.

As shown in FIG. 6, since operation of the server communication section 16 does not necessarily involve periodically writing a data file including a divided data file into a storage location or periodically reading the data file from the storage location, the reading rate S(t) or the writing rate U(t) acknowledge by the file system management section 15 is input to the rate measurement section 17 on an irregular basis.

The storage section 18 is a storage device that enables unlimited reading and writing of a data file, and stores programs to be executed by the application 11, the access control section 12, the secret distribution processing section 13, the selector 14, and the file system management section 15 and various sets of data utilized by the respective programs. Further, the storage section 18 stores the map table MT.

The application 11, the access control section 12, the secret distribution processing section 13, the selector 14, and the file system management section 15 can be configured from hardware or software. In particular, when these sections are configured from software, the respective sections become able to operate by means of a built-in CPU (central processing unit) of the user device 10 reading from the storage section 13 respective programs that include previously defined operation of the respective sections.

The RAM 19 is utilized for work memory during operation of each of the sections of the user device 10. For instance, in accordance with acknowledgment information from the access control section 12, the map table MT read from the storage section 18 by the file system management section 15 is temporarily extracted and stored.

Figure 3:
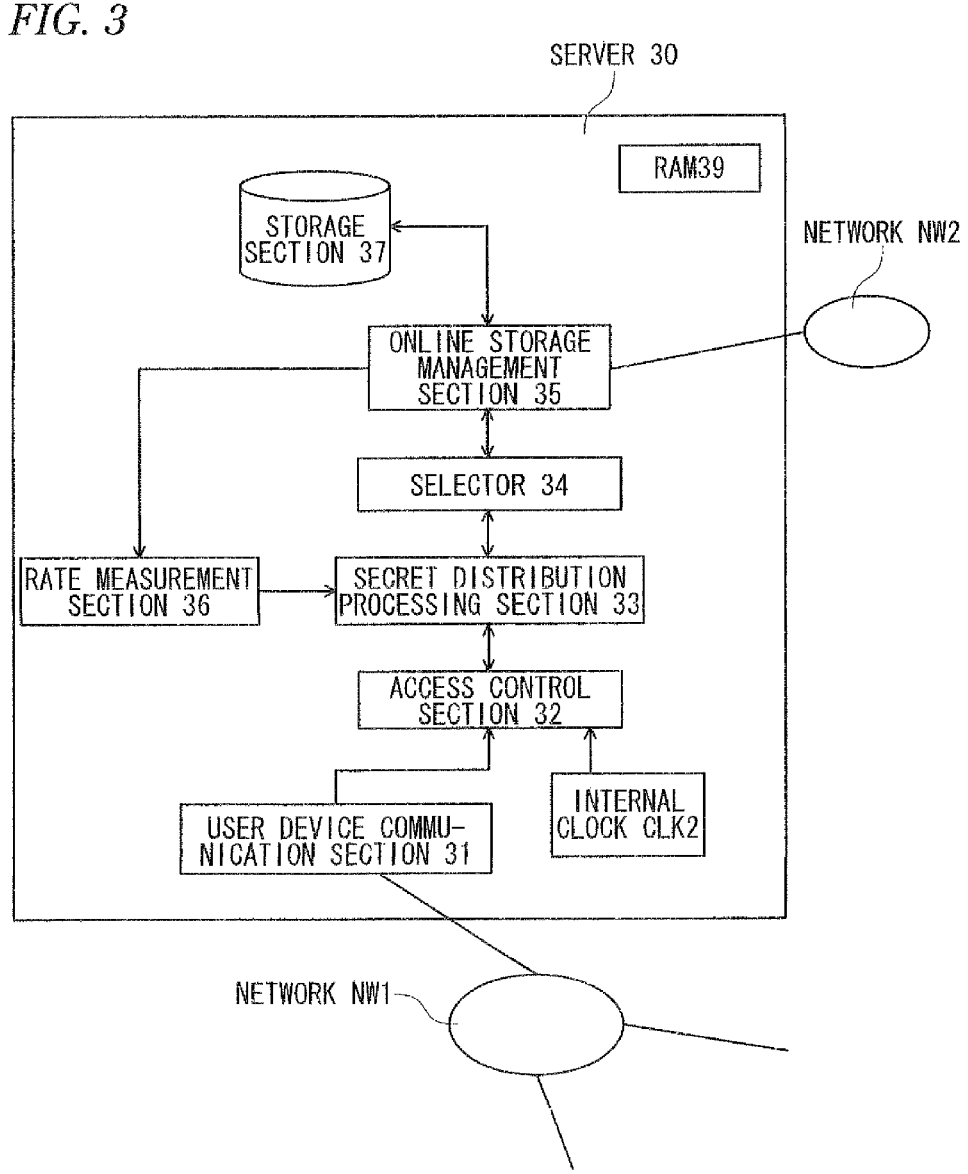
FIG. 3 is a block diagram showing an internal configuration of a server.

(Server: FIG. 3)

Incidentally, the server 30 can also include an internal configuration analogous to the above-described internal configuration of the user device 10. FIG. 3 shows a block diagram of the internal configuration of the server 30 achieved in this case. FIG. 3 is a block diagram showing the internal configuration of the server 30. The sever 30 shown in FIG. 3 includes an internal clock CLK2, a user device communication section 31 corresponding to the server communication section 16, an access control section 32, a secret distribution processing section 33 serving as a division processing section, a selector 34 serving as a storage location selection section, an online storage management section 35 corresponding to the file system management section 15, a rate measurement section 36, a storage section 37, and RAM 39.

Since operation of the server 30 is analogous to operation of respective sections of the server 30 corresponding to the respective sections of the user device 10, repeated explanations about operation are omitted. However, explanations are provided to differences.

The user device communication section 31 works as an interface for establishing a communication with the user device 10 and receives a divided data file and a command for writing a divided data file, both of which are transmitted from the server communication section 16, or a command for reading a divided data file. The user device communication section 31 sends to the access control section 32 an acknowledgment of a divided data file and a command for writing a divided data file that have been received, or an acknowledgment of a received command for reading a divided data file.

In response to a command for reading or writing a divided data file output from the selector 34, the online storage management section 35 reads or writes a divided data file from or into the storage section 37 or a predetermined folder of the online storages 60-1, . . . , 60-p.

The access control section 32, the secret distribution processing section 33, the selector 34, and the online storage management section 35 can be configured from hardware or software. In particular, when these sections are configured from software, the respective sections become able to operate by means of a built-in CPU of the server 30 reading from the storage section 37 respective programs that include previously defined operation of the respective sections.

The RAM 39 is utilized as work memory for operations of the respective sections of the server 30.

Figure 7:
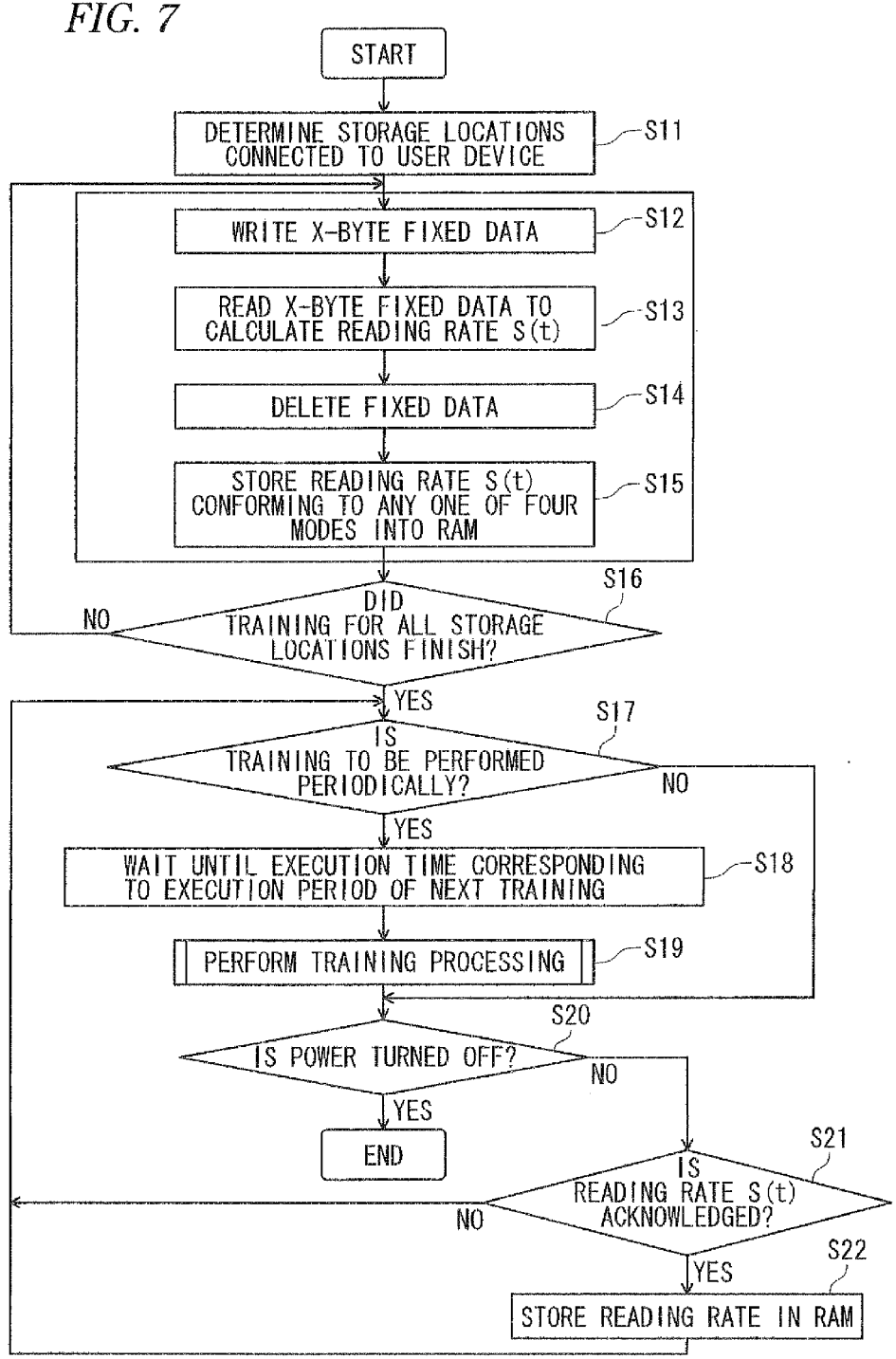
FIG. 7 is a flowchart for explaining training processing of the rate measurement section.

Operation of the rate measurement section 17 performed during training processing is now described by reference to FIG. 7. FIG. 7 is a flowchart for explaining training processing of the rate measurement section 17. FIG. 7 provides explanations about training processing performed by the rate measurement section 17 of the user device 10. However, similar operation can also be applied to training processing of the rate measurement section 36 of the server 30. Explanations about FIG. 7 are based on the premise that the user device 10 is in a condition achieved immediately after power-on or start-up. Further, although the reading rate is employed as a target of measurement (calculation) in FIG. 7, the writing rate can also be adopted.

In FIG. 7, the rate measurement section 17 makes an inquiry to the file system management section 15 about information pertaining to a data file storage location in the user device 10. On the basis of the inquiry from the rate measurement section 17, the file system management section 15 sends as a response to the rate measurement section 17 information about a data file storage location in the user device 10. The rate measurement section 17 thereby determines the information about the data file storage location in the user device 10 (S11).

Entire processing pertaining to steps S12 to S15 in FIG. 7 corresponds to training processing of the rate measurement section 17, and training processing pertaining to steps S12 to S15 is performed for each storage location determined in step S11. For simplicity of explanation, two storage locations are presumed to be available as information about a data file storage location in the user device 10. Namely, the first storage location A is presumed to correspond to the storage section 18, and the second storage location B is presumed to correspond to the online storage 50-1. The rate measurement section 17 performs training processing intended for the first storage location A.

The rate measurement section 17 writes X-byte fixed data into the storage section 18 by way of the DMA transfer channel CH1 (S12). The rate measurement section 17 reads the X-byte fixed data from the storage section 18 by way of the DMA transfer channel CH1 and calculates the reading rate S(t) from the volume (X bytes) of the fixed data and a time required to read the fixed data (S13). The rate measurement section 17 deletes the fixed data written in the storage section 18 by way of the DMA transfer channel CH1 (S14). The rate measurement section 17 stores in the RAM 19 a reading rate corresponding to any one of the maximum value, the minimum value, an average value, and the latest value of the reading rate S(t) of the storage section 18 that serves as the first storage location A (S15). As mentioned above, which one of the maximum value, the minimum value, an average value, and the latest value is selected as a reading rate by the rate measurement section 17 has been previously defined by operation of the rate measurement section 17.

When having not yet finished training processing of all storage locations (NO in S16), the rate measurement section 17 performs training processing for another storage location. When training processing for the online storage 50-1 that serves as the second storage location B is not performed, the rate measurement section 17 performs training processing pertaining to steps S12 to S15 in connection with the online storage 50-1.

Specifically, the rate measurement section 17 causes the server communication section 16 to write the X-byte fixed data into the online storage 50-1 by way of the DMA transfer channel CH2 (S12). The rate measurement section 17 causes the server communication section 16 to read the X-byte fixed data from the online storage 50-1 by way of the DMA transfer channel CH2 and receives an input of a read time by way of the server communication section 16. The rate measurement section 17 calculates the reading rate S(t) from the volume (X bytes) of the fixed data and a time required to read the fixed data (S13). The rate measurement section 17 causes the server communication section 16 to delete the fixed data written in the online storage 50-1 by way of the DMA transfer channel CH2 (S14). The rate measurement section 17 stores in the RAM 19 a reading rate corresponding to any one of the maximum value, the minimum value, an average value, and the latest value of the reading rate S(t) for the online storage 50-1 that serves as the second storage location B (S15).

When having finished training processing of all of the storage locations (YES in S16), the rate measurement section 17 is presumed not to be set so as to periodically perform training processing of all of the storage locations as shown in FIG. 6 (NO in S17). In this case, operation of the rate measurement section 17 proceeds to step S20.

In the meantime, when having finished training processing of all of the storage locations (YES in S16), the rate measurement section 17 is presumed to be set so as to periodically perform training processing of all of the storage locations as shown in FIG. 6 (YES in S17). In this case, the rate measurement section 17 waits, on the basis of clock information sent from the internal clock CLK1, for a period from a current time to a time when next training processing corresponding to an execution cycle of training processing is performed (S18). When an execution time corresponding to an execution cycle of training processing comes after the rate measurement section 17 waited in step S18, the rate measurement section 17 performs training processing analogous to that pertaining to steps s12 to S15 (S19).

It is preferable that training processing which is performed a plurality of times from steps S17 to S19 should be performed for a storage location connected by way of the network; namely, the online storage 50-1 serving as the second storage location. Since the reading rate or the writing rate of the storage section 18 is constant, the essential requirement is to measure the reading rate and the writing rate at the same time at; for instance, power-on (start-up) of the user device 10, or when the user device recognizes the storage section 18 as a device of the user device 10. However, the reading rate or the writing rate of the online storage 50-1 dynamically changes according to a degree of congestion of the network NW1. For this reason, performing training processing a number of times is preferable.

When the power of the user device 10 is turned off (YES in S20), operation of the rate measurement section 17 ends. However, if the power of the user device 10 is not turned off (NO in S20), operation of the rate measurement section 17 proceeds to step S21. When the reading rate S(t) is acknowledged by the file system management section 15 (YES in S21), the rate measurement section 17 temporarily stores the thus-acknowledged reading rate S(t) in the RAM 19 (S22). When the reading rate S(t) is not acknowledged by the file system management section 15 (NO in S21), operation of the rate measurement section 17 returns to step S17.

If the reading rate S(t) temporarily stored in the RAM 19 is desired to be retained even after power-off, what is necessary is to store the reading rate S(t) into the storage section 18, or the like.

Figure 8:
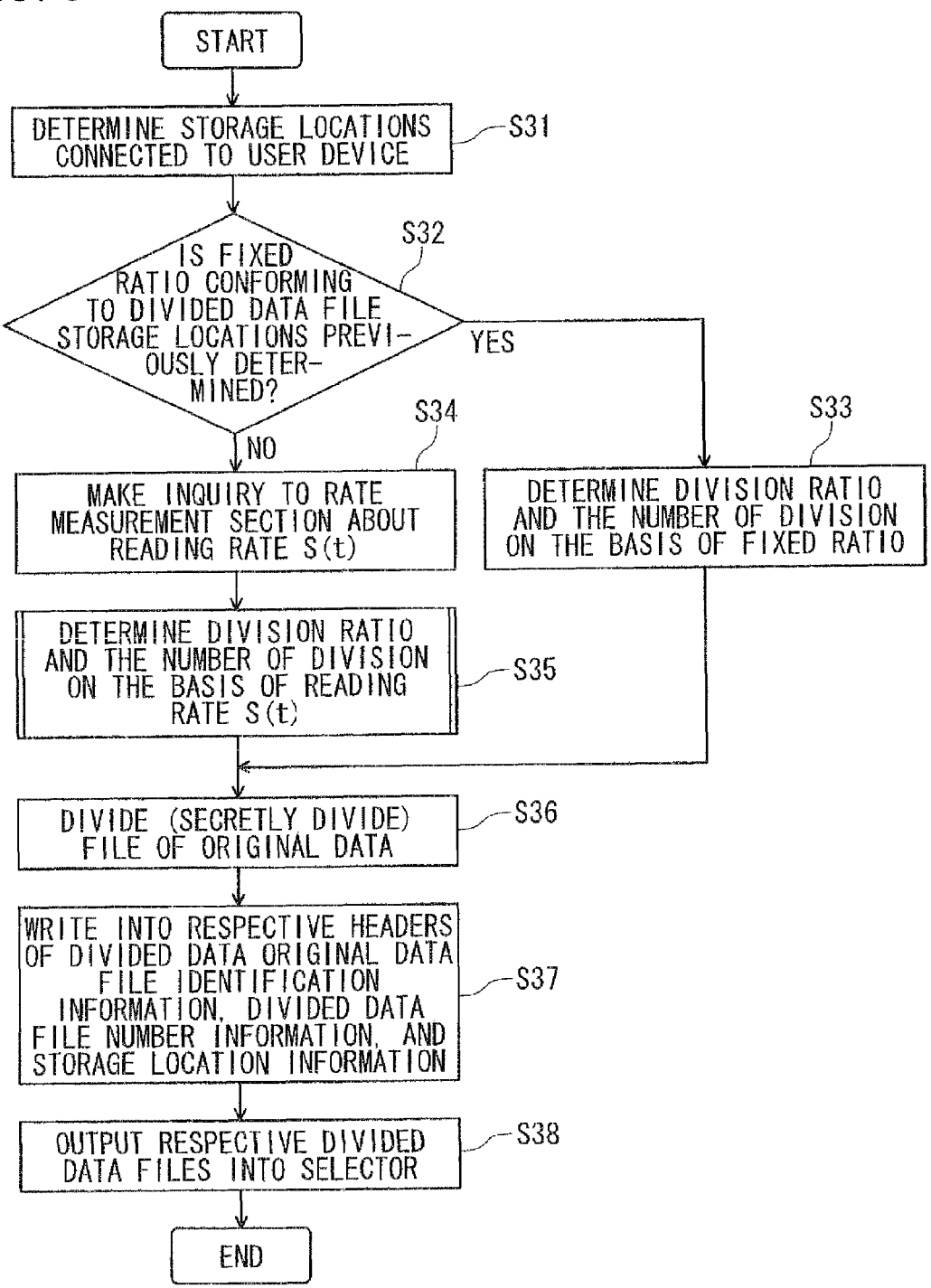
FIG. 8 is a flowchart for explaining operation of a secret distribution processing section performed when an original data fail is saved after being divided into divided data files.
Figure 9:
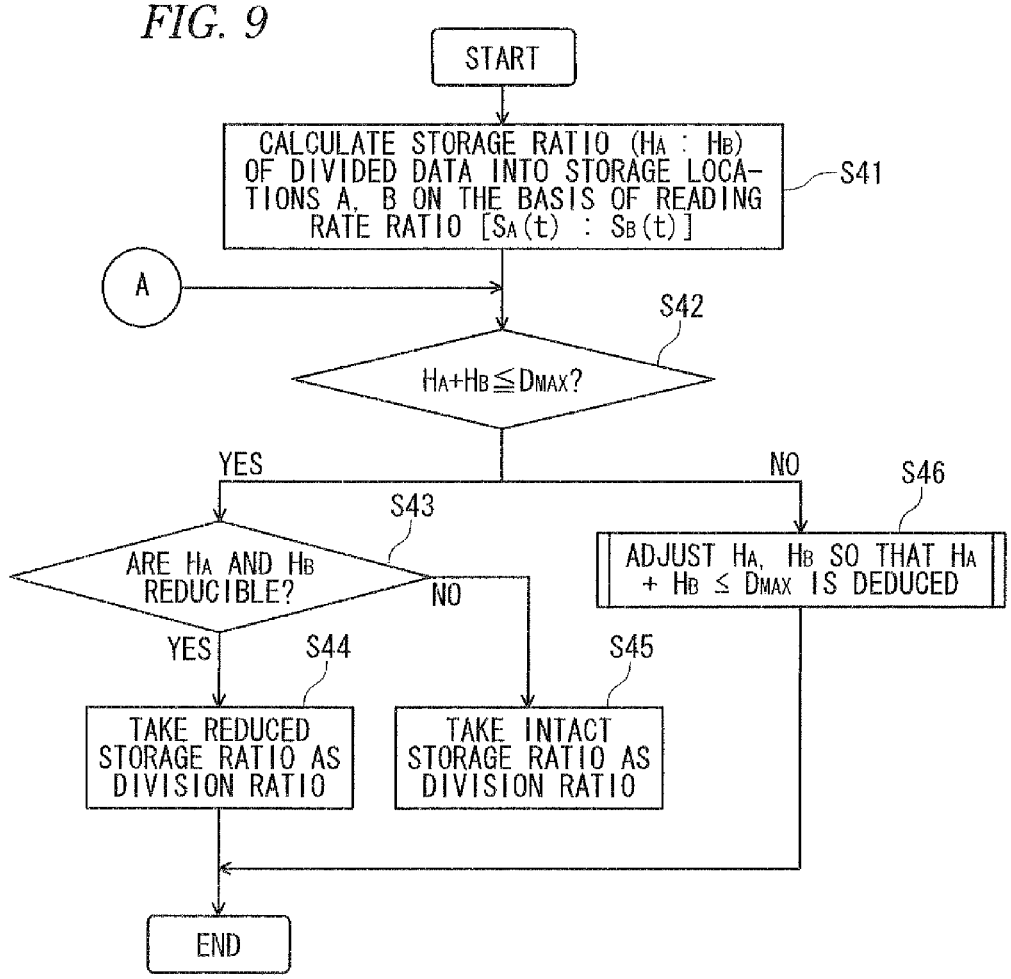
FIG. 9 is a flowchart explaining operation of the secret distribution processing section performed when a division ratio is determined.
Figure 10:
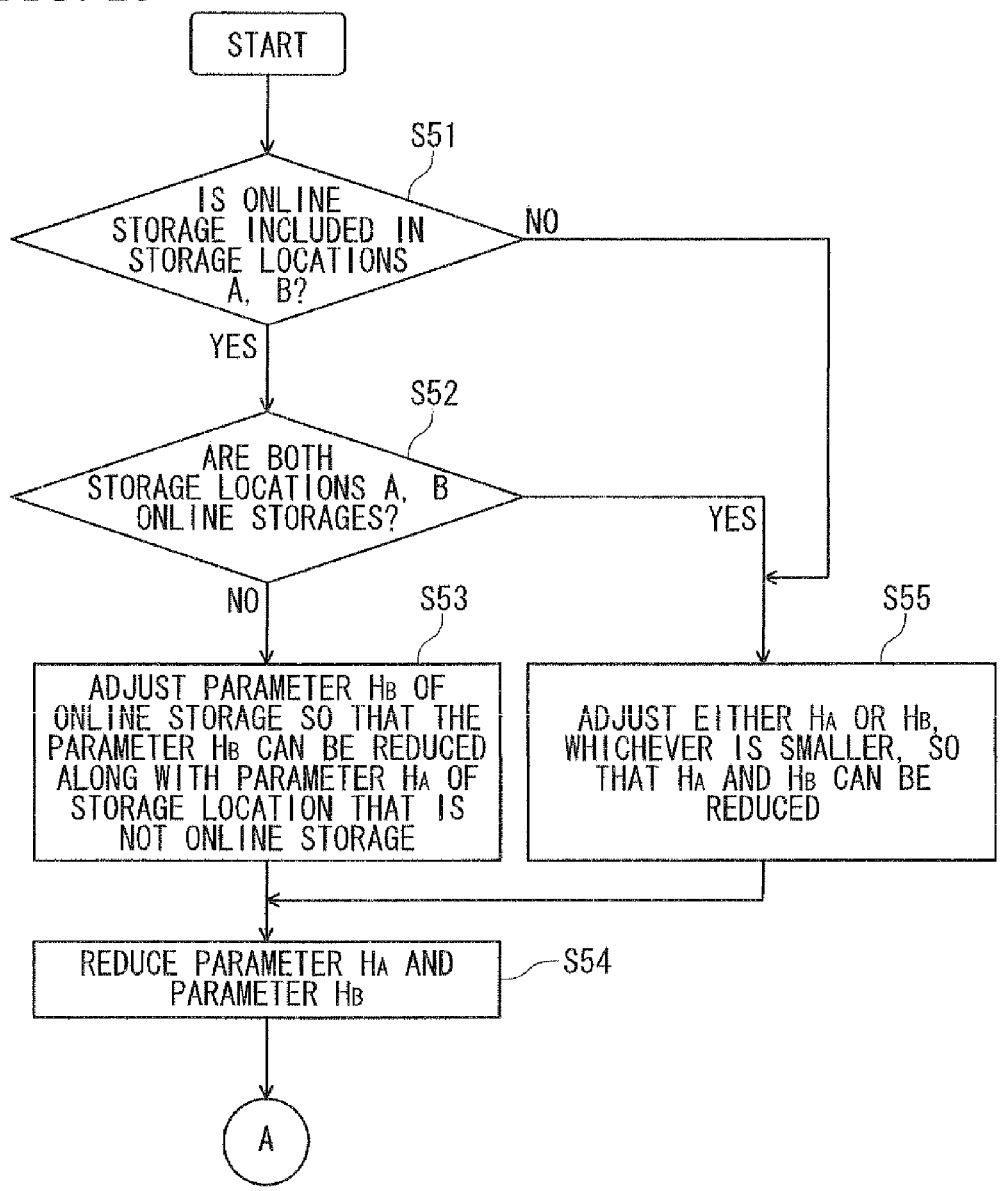
FIG. 10 is a flowchart for explaining operation of the secret distribution processing section performed when the division ratio is determined.
Figure 11:
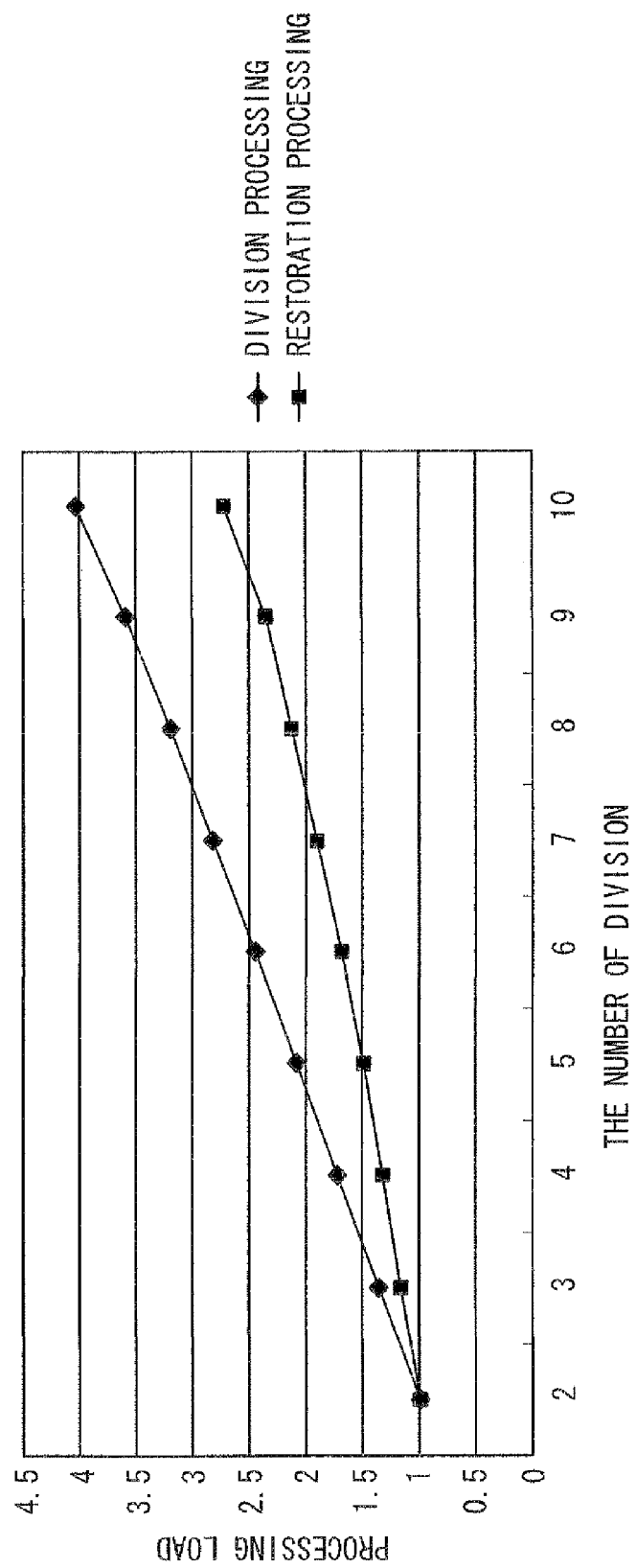
FIG. 11 is a graph showing processing load versus the number of division for division processing and restoration processing.

By reference to FIGS. 8 to 11, there is now described operation of the secret distribution processing section performed when the original data file is divided and when each of the thus-divided data files is stored in a storage location. FIG. 8 is a flowchart for explaining operation of the secret distribution processing section 13 performed when an original data fail is saved after being divided into divided data files. FIG. 9 is a flowchart explaining operation of the secret distribution processing section 13 performed when a division ratio is determined. FIG. 10 is a flowchart for explaining operation of the secret distribution processing section 13 performed when the division ratio is determined. FIG. 11 is a graph showing processing load versus the number of division for division processing and restoration processing.

In FIGS. 8 through 10, there is described operation of the secret distribution processing section 13 of the user device 10. However, similar operation can also be applied to operation of the secret distribution processing section 33 of the server 30.

In FIG. 8, the secret distribution processing section 13 makes an inquiry to the file system management section 15 about information pertaining to a data file storage location in the user device 10. On the basis of the inquiry from the secret distribution processing section 13, the file system management section 15 sends as a response to the secret distribution processing section 13 information about a data file storage location in the user device 10. The secret distribution processing section 13 thereby determines the information about the data file storage location in the user device 10 (S31). Alternatively, the secret distribution processing section 13 can also make an inquiry to the rate measurement section 17 about information pertaining to a data file storage location in the user device 10 and determine the information about a data file storage location in the user device 10 on the basis of response information sent from the rate measurement section 17.

The secret distribution processing section 13 receives an input of information about a record in the map table MT for the original data file that has been acknowledged by the access control section 12 and that is to be a target of division. The secret distribution processing section 13 determines whether or not a fixed ratio conforming to the location where there is stored the divided data file of the original data file has been previously set on the input information (S32).

When the fixed ratio conforming to the location where there is stored the divided data file of the original data file is determined to have been previously set on the input information (YES in S32), the secret distribution processing section 13 takes the fixed ratio as a division ratio and further divides data of the original data file that is to be a target of division into data of divided data files, the number of which conforms to the division ratio (S33). After step S33, operation of the secret distribution processing section 13 proceeds to step S36.

When the fixed ratio conforming to the location where there is stored the divided data file of the original data file is determined not to have been previously set on the input information (NO in S32), the secret distribution processing section 13 makes an inquiry to the rate measurement section 17 about the reading rates S(t) of respective locations where there are stored the divided data files of the original data file that is to be a target of the division command (S34). In step S34, the secret distribution processing section 13 can also make an inquiry to the rate measurement section 17 about the writing rate U(t) in place of the reading rate S(t). In the following descriptions, an inquiry about the reading rate S(t) is to be made in step S34.

On the basis of the reading rates S(t) of the respective storage locations received a response from the rate measurement section 17, the secret distribution processing section 13 determines the division ratio and the number of division for the original data file that is to become a target of the division command (S35). By reference to FIGS. 9 and 10, detailed descriptions are provided to processing for determining a division ratio and the number of division in step S35. After step S35, operation of the secret distribution processing section 13 proceeds to step S36. Incidentally, it is preferable that the secret distribution processing section 13 should write the division ratio and the number of division, which were determined in step S35, into the record in the map table MT for the original data file that is to become a target of the division command.

On the basis of the division ratio and the number of division determined in step S33 or S35, the secret distribution processing section 13 subjects the original data file, which is to become a target of the division command, to division (secret division) (S36). The secret distribution processing section 13 writes, into respective header regions of the plurality of divided data files created by division processing, the original data file identification information 206, the divided data file number information 204, and the storage location information 205 (S37). The secret distribution processing section 13 outputs to the selector 14 a plurality of divided data files, each of which is made up of a header region and a data region (S38).

By reference to FIGS. 9 and 10, operation of the secret distribution processing section 13 performed when a division ratio is determined is now described. In the descriptions shown in FIGS. 9 and 10, the number of storage locations is assumed to be two (the storage location A and the storage location B).

In FIG. 9, the secret distribution processing section 13 calculates, from the reading rate $S_A(t)$ of the storage location A and the reading rate $S_B(t)$ of the storage location B received as responses from the rate measurement section 17 in step S34, a storage ratio $H_A:H_B$ representing the number of divided data files stored in the storage location A to the number of divided data files stored in the storage location B (S41). In step S41, reference symbol $H_A$ designates a reading rate $S_A(t)$ of the storage location A [$H_A=S_A(t)$], and reference symbol $H_B$ designates a reading rate $S_B(t)$ of the storage location B [$H_B=S_B(t)$].

Parameters $H_A$ and $H_e$ of the storage ratio $H_A:H_B$ can also be calculated by means of Mathematical Expression (1) and Mathematical Expression (2). In Mathematical Expression (1), the parameter $S_A$ designates a reading rate of the storage location A (e.g., the storage section 18); the parameter $S_B$ designates a reading rate of the storage location B (e.g., the online storage 50-1); and a parameter $D_{MAX}$ designates the maximum number of division previously defined by operation of the secret distribution processing section 13. When Mathematical Expression (1) and Mathematical Expression (2) stand, Mathematical Expression (3) to be described later also stands.

$$H_A = \frac{S_B}{S_A + S_B} \times D_{MAX} \qquad (1)$$

$$H_B = D_{MAX} - H_A \qquad (2)$$

On the basis of the storage ratio $H_A:H_B$ calculated in step S41, the secret distribution processing section 13 determines whether or not Mathematical Expression (3) stands (S42).

$$H_A + H_B \le D_{MAX} \qquad (3)$$

When Mathematical Expression (3) is determined to stand (YES in S42), the secret distribution processing section 13 determines whether or not $H_A$ and $H_B$ are reducible; namely, whether or not the greatest common factor G other than one exists between $H_A$ and $H_B$ (S43). In this regard, the greatest common factor G is not limited to an integer and assumes any actual number, such as 2.5.

When $H_A$ and $H_B$ are determined to be reducible (YES in S43), the secret distribution processing section 13 determines the storage ratio $H_A':H_B'$ acquired after reducing $H_A$ and $H_B$ by use of the greatest common factor G as a division ratio $D_A:D_B$ (S44). The secret distribution processing section 13 determines the number of division as $(D_A+D_B)$ from the division ratio $D_A:D_B$. In this case, when $H_A:H_B=4:2$, for instance, stands, the secret distribution processing section 13 determines the division ratio as 2:1 obtained after reducing $H_A:H_B$ by use of a greatest common factor of 2 rather than as 4:2, determining the number of division as 2+1=3 rather than 4+2=6.

When $H_A$ and $H_B$ are determined to be irreducible (NO in S43), the secret distribution processing section 13 determines the storage ratio $H_A:H_B$ calculated in step S41 as the division ratio $D_A:D_B$ (S45). Further, the secret distribution processing section 13 determines the number of division as $(D_A+D_B)(=H_A+H_B)$ from the division ratio $D_A:D_B$. In this case, when $H_A:H_B=5:2$, for instance, stands, the secret distribution processing section 13 determines the division ratio as 5:2 and the number of division as 5+2=7.

When the greatest common factor other than one exists between the parameter $H_A$ and the parameter $H_B$, the secret distribution processing section 13 determines the storage ratio $H_A':H_B'$ acquired after reduction processing as the division ratio $D_A:D_B$. The reason for this is that, the larger the number of division becomes in division processing including secret distribution processing or restoration processing, the greater load on division processing or restoration processing of the user device 10 becomes, as shown in FIG. 11. Accordingly, when the greatest common factor other than one exists between the parameter $H_A$ and the parameter $H_B$, the secret distribution processing section 13 determines as the division ratio $D_A:D_B$ the storage ratio $H_A':H_B'$ acquired after reduction of the parameters $H_A$ and $H_B$ by use of the greatest common factor G, so the load on processing of the user device 10 can thereby be lessened.

Although the upper limit of the number of division is defined in order to lessen the load on processing of the user device 10, division can also be performed without defining the upper limit of the number of division.

In the meantime, when Mathematical Expression (3) is determined not to stand (NO in S42), the secret distribution processing section 13 adjusts the parameters $H_A$ and $H_B$ such that a conditional equation of step S42; namely, Mathematical Expression (3), stands (S46). Operation for regulation pertaining to step S46 is now described by reference to FIG. 10.

In FIG. 10, the secret distribution processing section 13 determines, on the basis of the information about a storage location determined in step S31, which one of the two storage locations A and B includes the online storage (S51). When the online storage is determined to be included in which one of the two storage locations A and B (YES in S51), the secret distribution processing section 13 determines whether or not both of the two storage locations A and B correspond to the online storages (S52).

When neither of the two storage locations A and B are determined to be online storages (NO in S52), the secret distribution processing section 13 adjusts the parameter $H_B$ of the online storage to a small value so that the parameter $H_B$ can be reduced along with the parameter $H_A$ of the storage location that is not the online storage (S53). The secret distribution processing section 13 reduces the parameter $H_A$ and the parameter $H_B$ adjusted in step S53 by use of the greatest common factor G other than one (S54).

For instance, when the storage ratio $H_A:H_B$ calculated in step S41 is "13:7," the secret distribution processing section 13 adjusts the parameter $H_B$ to a small value (6.5) so that the parameter $H_B$ can be reduced along with the parameter $H_A$ (13) in step S53, thereby determining the storage ratio as "13:6.5." In step S54, "13:6.5" is reduced to "2:1" by use of the greatest common factor G=6.5. Next operation of the secret distribution processing section 13 pertaining to step S54 proceeds to step S42.

When both of the two storage locations A and B are determined to be online storages (YES in S52), the secret distribution processing section 13 adjusts a smaller value (e.g., the parameter $H_B$) of the parameters $H_A$ and $H_B$ to a small value so that the parameter $H_A$ and the parameter $H_B$ of the two online storages can be reduced (S55). The secret distribution processing section 13 reduces the parameter $H_A$ and the parameter $H_B$ adjusted in step S55 by use of the greatest common factor G other than one (S54).

For instance, when the storage ratio $H_A:H_B$ calculated in step S41 is "3.6:2.6," the secret distribution processing section 13 adjusts the parameter $H_B$ to a small value (2.4) so that the parameter $H_B$ can be reduced along with the parameter $H_A$ (3.6) in step S55, thereby determining the storage ratio as "3.6:2.4." In step S54, "3.6:2.4" is reduced to "3:2" by use of the greatest common factor G=1.2 in step S54. Next operation of the secret distribution processing section 13 pertaining to step S54 proceeds to step S42.

When neither of the two storage locations A and B are determined to include online storages (NO in S51), the secret distribution processing section 13 adjusts a smaller parameter of the parameters $H_A$ and $H_B$ (e.g., the parameter $H_B$) to a small value so that the parameter $H_A$ and the parameter $H_B$ of the two storage locations (e.g., the storage section 18 and the external storage medium 40) can be reduced (S55). The secret distribution processing section 13 reduces the parameter $H_A$ and the parameter $H_B$ adjusted in step S55 by use of the greatest common factor G other than one (S54).

Figure 12:
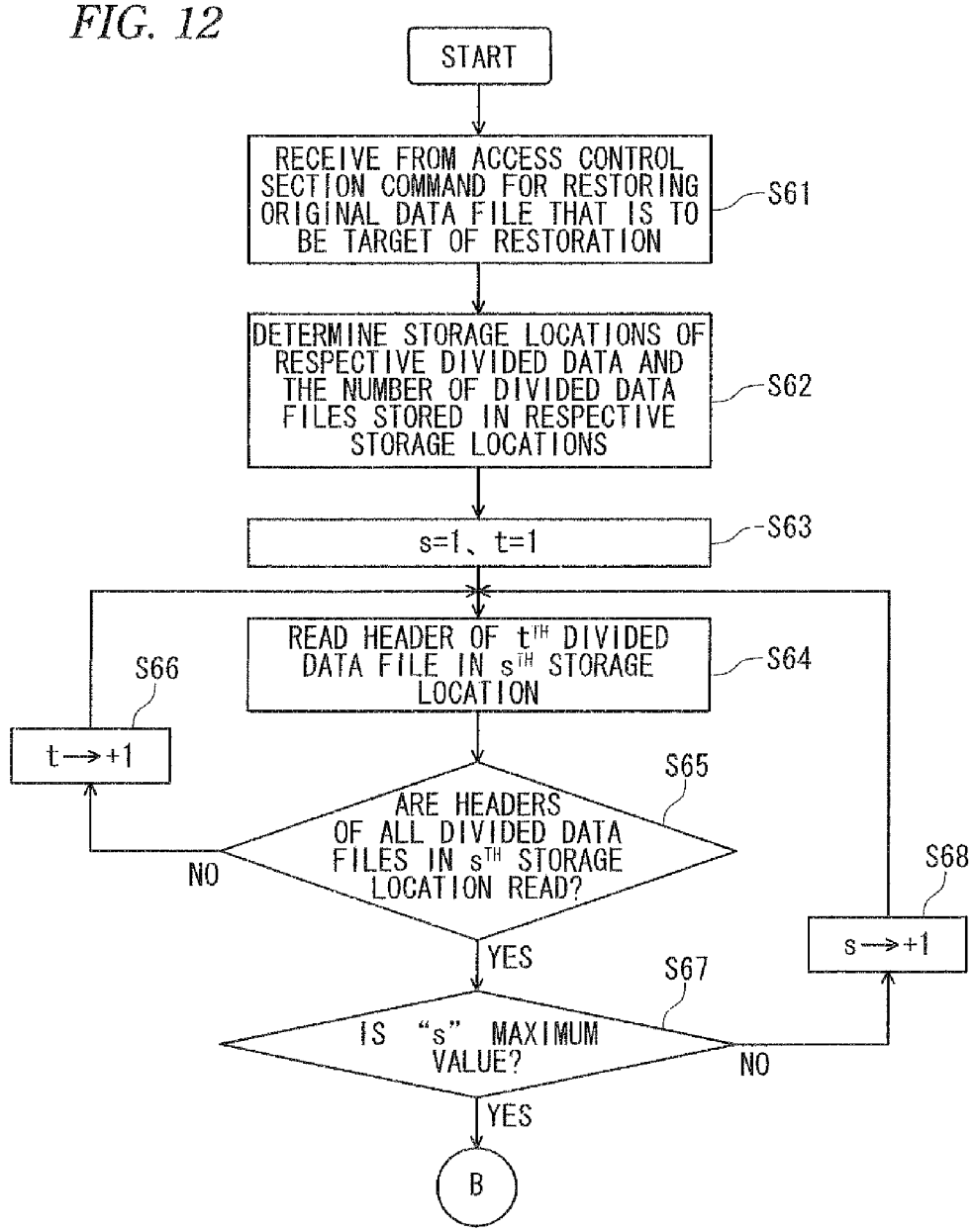
FIG. 12 is a flowchart for explaining operation of the secret distribution processing section performed when the original data file is restored.
Figure 13:
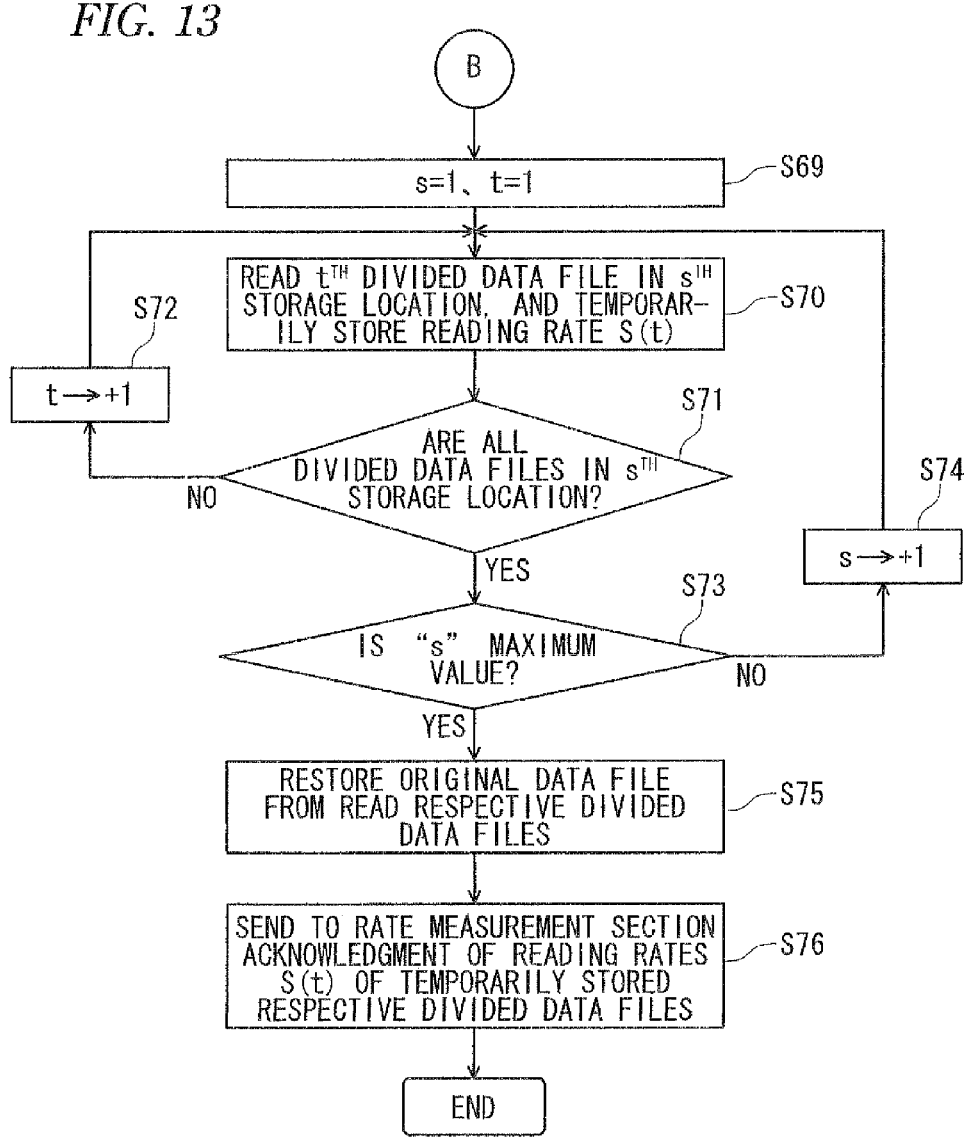
FIG. 13 is a flowchart for explaining operation of the secret distribution processing section performed when the original data file is restored.

Operation of the secret distribution processing section 13 performed when the original data file is restored by use of the plurality of divided data files is now described by reference to FIGS. 12 and 13. FIG. 12 is a flowchart for explaining operation of the secret distribution processing section 13 performed when the original data file is restored, and FIG. 13 is a flowchart for explaining operation of the secret distribution processing section 13 performed when the original data file is restored.

In FIG. 12, the secret distribution processing section 13 receives from the access control section 12 a command for restoring the original data file that is to be a target of the restoration command (S61). Specifically, the secret distribution processing section 13 receives an input of information about a record in the map table MT of the original data file that is to be a target of restoration and that is acknowledged by the access control section 12.

The secret distribution processing section 13 determines, on the basis of the record of the map table MT into which the division ratio and the number of division determined in step S35 are written, a division ratio and the number of division achieved on occasions of division of the original data file to be a target of a restoration command, and further determines respective storage locations of the respective divided data files (S62).

The secret distribution processing section 13 initializes the number of storage locations "s" and the number of divided data files "t" stored in the "$s^{th}$" storage location (S63) and reads a header of the $t^{th}$ divided data file in the $s^{th}$ storage location (S64). The secret distribution processing section 13 determines whether or not headers of all the divided data files in the $s^{th}$ storage location have been read (S65).

When not all the headers of the divided data files in the $s^{th}$ storage location are determined to have been read (NO in S65), the secret distribution processing section 13 increments the parameter "t" (S66). Operation of the secret distribution processing section 13 performed after step S66 proceeds to step S64. Accordingly, operation pertaining to steps S64 to S66 is iterated until the headers of all the divided data files in the $s^{th}$ storage location are read.

When the headers of all the divided data files in the $s^{th}$ storage location are determined to have been read (YES in S65), the secret distribution processing section 13 determines whether or not the parameter "s" determined in step S62 is the maximum value (S67). When the parameter "s" determined in step S62 is determined not to be the maximum value (NO in S67), the secret distribution processing section 13 increments the parameter "s" (S68). Operation of the secret distribution processing section 13 achieved after step S68 proceeds to step S64. Accordingly, operation pertaining to steps S64 to S68 is iterated until the headers of all the divided data files in all the storage locations are read.

The parameter "s" determined in step S62 is the maximum value; namely, the headers of all the divided data files in all the storage locations are determined to have been read. In this case (YES in S67), the secret distribution processing section 13 initializes the number of storage locations "s" and the number of divided data files "t" stored in the $s^{th}$ storage location (S69) and reads the $t^{th}$ divided data file in the $s^{th}$ storage location (S70). Moreover, the secret distribution processing section 13 temporarily stores the reading rate S(t) achieved when the divided data file has been read into the RAM 19 (S70). The secret distribution processing section 13 determines whether or not all the divided data files in the $s^{th}$ storage location have been read (S71).

When not all the divided data files in the $s^{th}$ storage location are determined to have been read (NO in S71), the secret distribution processing section 13 increments the parameter "t" (S72). Operation of the secret distribution processing section 13 subsequent to step S72 proceeds to step S70.

Accordingly, operation pertaining to steps S70 to S72 is iterated until all the divided data files in the $s^{th}$ storage location are read.

When all the divided data files in the $s^{th}$ storage location are determined to have been read (YES in S71), the secret distribution processing section 13 determines whether or not the parameter "s" determined in step S62 is the maximum value (S73). When the parameter "s" determined in step S62 is determined not to be the maximum value (NO in S73), the secret distribution processing section 13 increments the parameter "s" (S74). Operation of the secret distribution processing section 13 subsequent to step S74 proceeds to step S70. Accordingly, operation pertaining to steps S70 to S74 is iterated until the headers of all the divided data files in all the storage locations are read.

The parameter "s" determined in step S62 is the maximum value; namely, all the divided data files in all the storage locations are determined to have been read. In this case (YES in S73), the secret distribution processing section 13 restores the original data file from the respective read, divided data files (S75). When reading the respective divided data files, the secret distribution processing section 13 sends to the rate measurement section 17 an acknowledgment of the respective reading rates temporarily stored in the RAM 19 (S76).

As above, the user device 10 serving as an information processing equipment of the embodiment determines the division ratio and the number of division pertaining to the divided data files on the basis of the reading rate or the writing rate of the divided data file storage location. For these reasons, the user device 10 stores a larger number of divided data files into a storage location exhibiting a large reading rate and stores a smaller number of divided data files into a storage location exhibiting a small reading rate. Since the user device 10 can thereby efficiently determine the number of divided data files to be stored, the time required to read or write the respective divided data files from or to the divided data file storage location can be reduced, and comfortable operability can be provided to the user.

Specifically, when data files of 100-megabit original data are available, the data files are divided into a large-size divided data file and a small-size divided data file in the related art; for instance, a 90-megabit divided data file and a 10-megabit divided data file. In this case, the 90-megabit divided data file is stored in a user device 108, and the 10-megabit divided data file is stored in the server 30.

On occasions where the data files are restored, when a reading rate of the user device 108 is; for instance, 20 Mbps and when a reading rate of the server 30 is 10 Mbps, the divided data file of the user device 108 is read in 4.5 seconds, whilst the divided data file in the server 30 is read in one second. Thus, a reading time incurred by all the divided data files comes to 4.5 seconds.

However, when the reading rate of the server 30 is 1 Mbps because of data congestion, reading the divided data file in the server 30 involves consumption of 10 seconds. Therefore, reading all the divided data files requires 10 seconds, and the reading time resultingly becomes twice or more.

Moreover, when a 95-megabit divided data file is stored in the user device 108 and a 5-megabit divided data file is stored in the server 30 on the assumption that a time required for the server 30 to read divided data is long, reading the divided data in the user device 108 requires 4.75 seconds, and reading the divided data in the server 30 requires 0.5 seconds at 10 Mbps or five seconds at 1 Mbps. When the reading rate of the server 30 is high, reading all the divided data consumes much longer time than in the related art.

Accordingly, in the embodiment, creation of divided data files is performed previously taking into account a reading time so that reading (or writing) data can be performed efficiently, thus providing convenience to the user.

The above-mentioned reading rates are mere exemplifications and not limited to the aforementioned values.

The storage locations are not limited to specific locations, such as the server 30 and the external storage medium 40 connected to a processing device that performs secret distribution. However, in order to assure security, storing divided data files in the same physical location is at least avoided. When the divided data file is stored in; for instance, the external storage medium 40, one of the divided data files is stored in USB memory, and the other divided data file is stored in an SD card.

Figure 14:
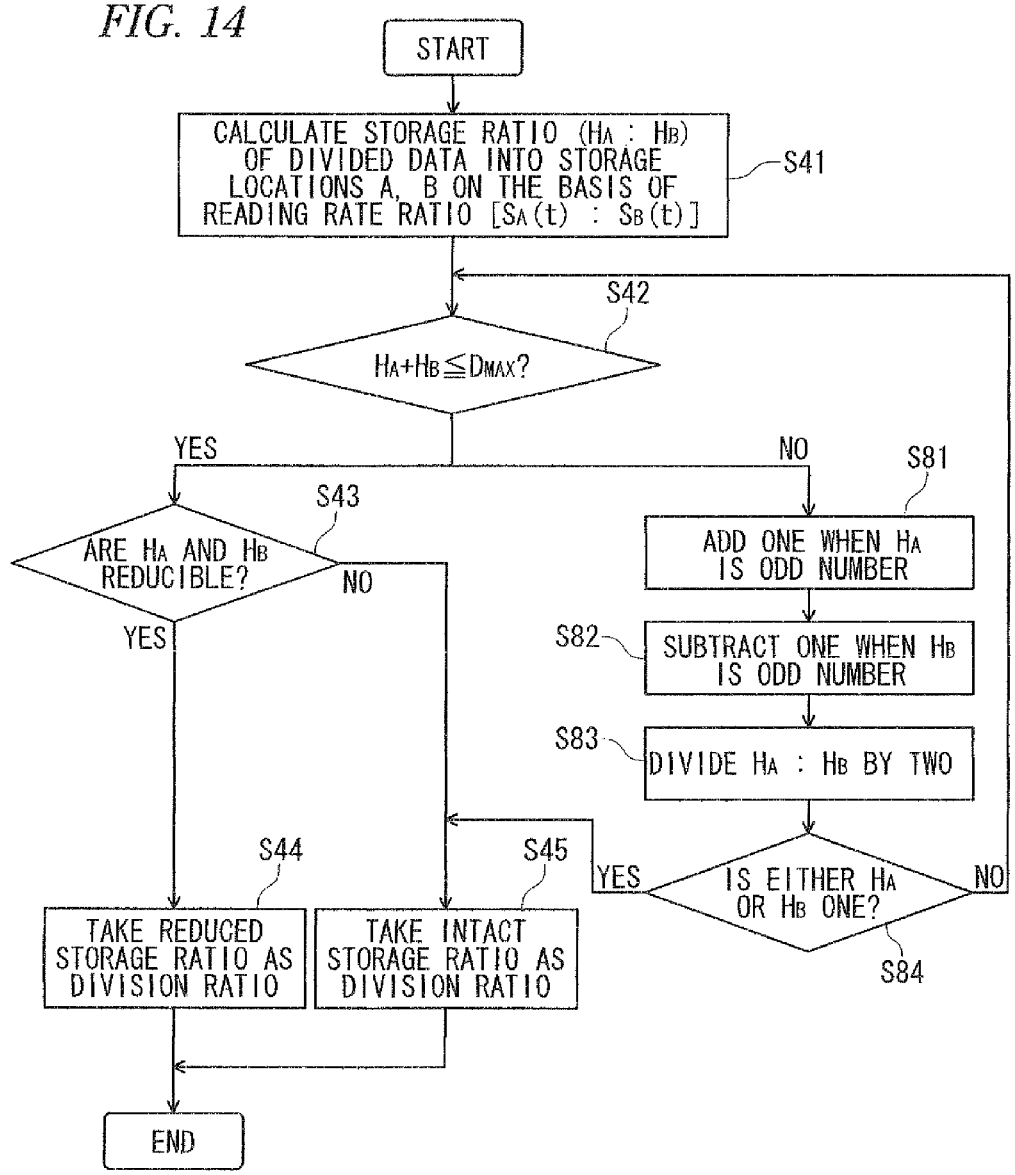
FIG. 14 is a flowchart for explaining another operation of the secret distribution processing section performed when the division ratio is determined.

The secret distribution processing section 13 can operate in a way such as that shown in FIG. 14 rather than that shown in FIG. 9. FIG. 14 is a flowchart for explaining another operation of the secret distribution processing section when the division ratio is determined. Explanations about FIG. 14, which are the same as those about FIG. 9, are omitted for clarity, and explanations are given to differences as follows. Reference symbol $S_A$ (or $H_A$) designates a reading rate of the storage section 18, and $S_B$ (or $H_B$) designates a reading rate of the online storage 50-1.

In step S41 shown in FIG. 14, the storage ratio $H_A:H_B$ is calculated as an integral ratio. For instance, the storage ratio $H_A:H_B$ is presumed to be 73:18. In the drawing, when Mathematical Expression (3) is determined not to stand (NO in S42), the secret distribution processing section 13 adds one to the parameter $H_A$ when the parameter $H_A$ is an odd number (S81). For instance, the storage ratio $H_A:H_B$ comes to 74:18. In step S81, the secret distribution processing section 13 does not add one to the parameter $H_A$ when the parameter $H_A$ is an even number.

Subsequently, when the parameter $H_B$ is an odd number, the secret distribution processing section 13 subtracts one from the parameter $H_B$ (S82). When the parameter $H_B$ is an even number, the secret distribution processing section 13 does not subtract one from the parameter $H_B$ in step S82. Accordingly, in steps S81 and S82, the parameter ratio $H_A:H_B$ comes to a ratio an even number:even number (e.g., 74:18).

Subsequently, the secret distribution processing section 13 divides the parameters $H_A:H_B$ by two (S83). For instance, the storage ratio $H_A H_B$ comes to 37:9. When a result achieved in step S83 shows that neither the parameter $H_A$ nor the parameter $H_B$ is one (NO in S84), processing pertaining to steps S81 to S83 is iterated until either the parameter $H_A$ or $H_B$ comes to one.

For instance, one is added to $H_A$ in 37:9, and one is subtracted from $H_B$ in the same, whereby the storage ratio $H_A:H_B$ comes to 38:8. The storage ratio 38:8 is then divided by two, whereby 19:4 is obtained. Further, the storage ratio $H_A:H_B$ likewise comes to 20:4, then to 10:2, and finally to 5:1.

When either the parameter $H_A$ or $H_B$ is one (YES in S84), operation of the secret distribution processing section 13 proceeds to step S45.

FIG. 14 shows a mere exemplification. In steps S81 and S82, when the storage locations connected to the secret distribution processing section 13 are any locations other than the online storage (a storage that can be accessed by the user device 10 without involvement of the network: e.g., the storage section 18, the external storage medium, and the like) and when one of the parameters is an odd number, it is preferable to add one to the parameter. In contrast, when the storage locations are online storages (including the server 30 and the storage section 37) and when one of the parameters is an odd number, it is preferable to subtract one from the parameter.

Incidentally, when both of the storage locations are online storages or when neither of the storage locations are other than online storages, processing can be performed as mentioned above, or one can also be added to or subtracted from both of the parameters.

In FIG. 14, one is added to or subtracted from the parameter while attention is paid to the odd number. However, if both parameters can be made reducible regardless of the condition; that is, an odd number, a number other than one can also be added or subtracted.

In the embodiment, data are divided into two data files. However, data can also be divided into three or more files, and they can be stored in three locations, respectively. In this case, the essential requirement is to determine file sizes according to reading rates or writing rates of the respective three storages in the same way as in the case where data are divided into two.

Although various embodiments have been described thus far by reference to the drawings, needless to say, the invention is not limited to the embodiments. It is manifest to those who are skilled in the art to contrive modifications or alterations of the embodiments and also example combinations of the embodiments without departing the scope of the invention defined in claims, and the modifications and the alterations shall be naturally construed to fall within the technical scope of the invention.

In the embodiment, the exemplifications of division processing have been described by use of secret distribution processing. However, division processing is not limited to secret distribution processing. For instance, common key encryption processing or open key encryption processing can also be used. Moreover, the method of secret distribution processing is not limited to a (2, 2) threshold value secret distribution method, and another secret distribution processing method is also applicable.

INDUSTRIAL APPLICABILITY

The invention is useful as an information processing equipment capable of diminishing time required to read or write divided data files from or into divided data file storage locations and providing the user with comfortable operability.

What is claimed is:

1. An information processing equipment capable of being connected to an external storage comprising:
    a division processor configured to divide original data into a plurality of sets of divided data;
    an internal storage configured to store the divided data;
    a storage location selector configured to select the external storage and the internal storage as storage locations for the plurality of sets of divided data and to store the divided data into the selected storage locations; and
    a rate measurer configured to write predetermined data in each of the storage locations and to measure a data reading rate and/or a data writing rate of the storage location on the basis of the time required to read and/or write the predetermined data, wherein:
    the division processor is configured to determine a division ratio of divided data between the external storage and the internal storage according to a data reading rate and/or a data writing rate of the storage locations selected by the storage location selector, and
    wherein the division processor is configured to divide the original data into divided pieces, a number of which is equal to a total number of division ratio, and to distribute the divided pieces according to the division ratio, thereby creating the divided data.

2. The information processing equipment according to claim 1, wherein the divided pieces are divided such that the number of the divided pieces does not exceed a predetermined number.

3. The information processing equipment according to claim 1, wherein the division processor creates divided data by use of a secret distribution method.

4. The information processing equipment according to claim 1, wherein the external storage is connected to the information processing equipment by way of a network.

5. The information processing equipment according to claim 1, wherein, when the determined division ratio is reducible, the division processor is configured to take a reduced division ratio as a division ratio for the original data.

6. The information processing equipment according to claim 1, wherein the division processor is configured to write into headers of the divided data at least identification information about the original data and the number of divided pieces for each of the storage locations where the divided data are stored.

7. An information processing equipment capable of being connected to an external storage comprising:
    a division processor configured to divide original data into a plurality of sets of divided data;
    an internal storage configured to store the divided data; and
    a storage location selector configured to select the external storage and the internal storage as storage locations for the plurality of sets of divided data and to store the divided data into the selected storage locations, wherein:
    the division processor is configured to determine a division ratio of divided data between the external storage and the internal storage according to a data reading rate and/or a data writing rate of the storage locations selected by the storage location selector,
    wherein the division processor is configured to divide the original data into divided pieces, a number of which is equal to a total number of division ratio, and to distribute the divided pieces according to the division ratio, thereby creating the divided data, and
    predetermined data are written into each of the storage locations by use of DMA transfer, and a data reading rate and/or a data writing rate of the storage locations is measured on the basis of time required to read and/or write the predetermined data.

8. The information processing equipment according to claim 7, wherein the divided pieces are divided such that the number of the divided pieces does not exceed a predetermined number.

9. The information processing equipment according to claim 7, wherein the division processor creates divided data by use of a secret distribution method.

10. The information processing equipment according to claim 7, wherein the external storage is connected to the information processing equipment by way of a network.

11. The information processing equipment according to claim 7, wherein, when the determined division ratio is reducible, the division processor is configured to take a reduced division ratio as a division ratio for the original data.

12. The information processing equipment according to claim 7, wherein the division processor is configured to write into headers of the divided data at least identification information about the original data and the number of divided pieces for each of the storage locations where the divided data are stored.

13. An information processing equipment capable of being connected to an external storage comprising:
- a division processor configured to divide original data into a plurality of sets of divided data;
- an internal storage configured to store the divided data; and
- a storage location selector configured to select the external storage and the internal storage as storage locations for the plurality of sets of divided data and to store the divided data into the selected storage locations, wherein:
- the division processor is configured to determine a division ratio of divided data between the external storage and the internal storage according to a data reading rate and/or a data writing rate of the storage locations selected by the storage location selector,
- wherein the division processor is configured to divide the original data into divided pieces, a number of which is equal to a total number of division ratio, and to distribute the divided pieces according to the division ratio, thereby creating the divided data, and
- the data reading rate and/or the data writing rate for the storage locations, whichever corresponds to a maximum value, a minimum value, an average value, and a latest value of the reading rate and/or the writing rate, is acknowledged to the division processor, and
- the division processor is configured to create divided data by use of the acknowledged reading rate and/or writing rate.

14. The information processing equipment according to claim 13, wherein the divided pieces are divided such that the number of the divided pieces does not exceed a predetermined number.

15. The information processing equipment according to claim 13, wherein the division processor creates divided data by use of a secret distribution method.

16. The information processing equipment according to claim 13, wherein the external storage is connected to the information processing equipment by way of a network.

17. The information processing equipment according to claim 13, wherein, when the determined division ratio is reducible, the division processor is configured to take a reduced division ratio as a division ratio for the original data.

18. The information processing equipment according to claim 13, wherein the division processor is configured to write into headers of the divided data at least identification information about the original data and the number of divided pieces for each of the storage locations where the divided data are stored.

* * * * *